US010725999B2

(12) United States Patent
Okumura et al.

(10) Patent No.: US 10,725,999 B2
(45) Date of Patent: Jul. 28, 2020

(54) EXTRACTION PROGRAM, EXTRACTION DEVICE AND EXTRACTION METHOD

(71) Applicant: FUJITSU LIMITED, Kawasaki-shi, Kanagawa (JP)

(72) Inventors: Hitoshi Okumura, Yokohama (JP); Takahide Muramoto, Zama (JP); Masaru Uchida, Sagamihara (JP)

(73) Assignee: FUJITSU LIMTIED, Kawasaki (JP)

( * ) Notice: Subject to any disclaimer, the term of this patent is extended or adjusted under 35 U.S.C. 154(b) by 572 days.

(21) Appl. No.: 15/439,220

(22) Filed: Feb. 22, 2017

(65) Prior Publication Data
US 2017/0262492 A1 Sep. 14, 2017

(30) Foreign Application Priority Data

Mar. 11, 2016 (JP) .................................. 2016-048980

(51) Int. Cl.
*G06F 16/43* (2019.01)
*G06F 16/23* (2019.01)

(52) U.S. Cl.
CPC .......... *G06F 16/2365* (2019.01); *G06F 16/43* (2019.01)

(58) Field of Classification Search
CPC ........ G06F 16/43; G06F 16/27; G06F 16/313; G06F 16/2365

(Continued)

(56) References Cited

U.S. PATENT DOCUMENTS 5,822,747 A 10/1998 Graefe et al.
7,831,442 B1 * 11/2010 Chappel ............... G06Q 10/087
705/2

(Continued)

FOREIGN PATENT DOCUMENTS

JP 2006-260056 A 9/2006
JP 2011-2911 A 1/2011

(Continued)

OTHER PUBLICATIONS

Extended European Search Report dated May 24, 2017, issued in the counterpart European Patent Application No. 17157597.0. (6 pages).

(Continued)

*Primary Examiner* — Dung K Chau
(74) *Attorney, Agent, or Firm* — Westerman, Hattori, Daniels & Adrian, LLP

(57) ABSTRACT

A non-transitory computer-readable storage medium storing therein an extraction program that causes a computer to execute a process includes: referring to a storage that stores correspondence information associating extraction attributes which match respective attributes of each data element included in a plurality of data elements, from among extraction attributes included in verification rules, and verification rules which include the extraction attributes, and identifying, for each of the plurality of data elements and for each attribute, the verification rule including the extraction attributes matching each attribute; identifying, for each of the plurality of data elements, a common verification rule which is common in the verification rules corresponding to the attributes of each data element; and extracting, for each verification rule, data for which the verification rule has been identified as the common verification rule.

14 Claims, 31 Drawing Sheets

(58) Field of Classification Search
USPC ....... 707/694, 610; 705/14.27, 44, 2, 64, 65; 704/9
See application file for complete search history.

(56) References Cited

U.S. PATENT DOCUMENTS

| | | | |
|---|---|---|---|
| 8,768,838 B1* | 7/2014 | Hoffman | G06Q 40/00 705/44 |
| 2006/0143144 A1* | 6/2006 | Speeter | H04L 67/125 706/47 |
| 2006/0149408 A1* | 7/2006 | Speeter | G06F 8/71 700/126 |
| 2007/0255553 A1* | 11/2007 | Nomoto | G06F 16/313 704/9 |
| 2010/0318492 A1 | 12/2010 | Utsugi | |
| 2013/0110609 A1* | 5/2013 | Lee | G06Q 30/0226 705/14.27 |
| 2013/0124463 A1* | 5/2013 | Lee | G06F 16/27 707/610 |

FOREIGN PATENT DOCUMENTS

| | | |
|---|---|---|
| WO | 93/17381 A1 | 9/1993 |
| WO | 02/41190 A2 | 5/2002 |

OTHER PUBLICATIONS

Office Action dated Nov. 26, 2019, issued in counterpart JP application No. 2016-048980, with English translation. (5 pages).

* cited by examiner

FIG. 2

| ITEM NUMBER | SUBJECT | VALUE |
|---|---|---|
| 1 | SALES | 10000000 |
| 2 | SALES | 20000000 |
| 3 | SALES | 30000000 |
| 4 | COST OF SALES | 5000000 |
| 5 | COST OF SALES | 10000000 |
| 6 | COST OF SALES | 15000000 |
| ... | ... | ... |

FIG. 4A

| ITEM NUMBER | TYPE | VALUE |
|---|---|---|
| 1 | ITEM NAME | SALES |
| 2 | PRODUCT CATEGORY | HARDWARE |
| 3 | LOCATION CATEGORY | AMERICA |

FIG. 4B

| ITEM NUMBER | TYPE | VALUE |
|---|---|---|
| 1 | ITEM NAME | SALES |
| 2 | PRODUCT CATEGORY | SOFTWARE |
| 3 | LOCATION CATEGORY | JAPAN |

FIG. 4C

| ITEM NUMBER | TYPE | VALUE |
|---|---|---|
| 1 | ITEM NAME | SALES |
| 2 | PRODUCT CATEGORY | SOLUTIONS |
| 3 | LOCATION CATEGORY | AMERICA |

FIG. 5A

| ITEM NUMBER | TYPE | VALUE |
|---|---|---|
| 1 | ITEM NAME | COST OF SALES |
| 2 | PRODUCT CATEGORY | HARDWARE |
| 3 | LOCATION CATEGORY | AMERICA |

FIG. 5B

| ITEM NUMBER | TYPE | VALUE |
|---|---|---|
| 1 | ITEM NAME | COST OF SALES |
| 2 | PRODUCT CATEGORY | SOFTWARE |
| 3 | LOCATION CATEGORY | JAPAN |

FIG. 5C

| ITEM NUMBER | TYPE | VALUE |
|---|---|---|
| 1 | ITEM NAME | COST OF SALES |
| 2 | PRODUCT CATEGORY | SOLUTIONS |
| 3 | LOCATION CATEGORY | AMERICA |

FIG. 6A

| ITEM NUMBER | TYPE | VALUE |
|---|---|---|
| 1 | ITEM NAME | SALES |
| 2 | PRODUCT CATEGORY | SOLUTIONS |

FIG. 6B

| ITEM NUMBER | TYPE | VALUE |
|---|---|---|
| 1 | ITEM NAME | SALES |
| 2 | PRODUCT CATEGORY | HARDWARE |
| 3 | LOCATION CATEGORY | AMERICA |

FIG. 6C

| ITEM NUMBER | TYPE | VALUE |
|---|---|---|
| 1 | ITEM NAME | SALES |
| 2 | PRODUCT CATEGORY | SOFTWARE |

FIG. 6D

| ITEM NUMBER | TYPE | VALUE |
|---|---|---|
| 1 | PRODUCT CATEGORY | HARDWARE |

FIG. 6E

| ITEM NUMBER | TYPE | VALUE |
|---|---|---|
| 1 | ITEM NAME | SALES |
| 2 | PRODUCT CATEGORY | HARDWARE |
| 3 | LOCATION CATEGORY | JAPAN |

FIG. 6F

| ITEM NUMBER | TYPE | VALUE |
|---|---|---|
| 1 | LOCATION CATEGORY | Not AMERICA |

FIG. 7

| ITEM NUMBER | VERIFICATION RULE | INPUT DATA |
|---|---|---|
| 1 | 131a | DATA3, ··· |
| 2 | 131b | DATA1, ··· |
| 3 | 131c | DATA2, ··· |
| 4 | 131d | DATA1,DATA4, ··· |
| 5 | 131e | ··· |
| 6 | 131f | DATA2,DATA5, ··· |
| 7 | 131g | ALL DATA |

FIG. 8

| ITEM NUMBER | TYPE | VALUE | NUMBER OF DATA ELEMENTS |
|---|---|---|---|
| 1 | ITEM NAME | SALES | 6000 |
| 2 | ITEM NAME | COST OF SALES | 4000 |
| 3 | PRODUCT CATEGORY | HARDWARE | 7500 |
| 4 | PRODUCT CATEGORY | SOFTWARE | 2000 |
| 5 | PRODUCT CATEGORY | SOLUTIONS | 3500 |
| 6 | LOCATION CATEGORY | JAPAN | 9000 |
| 7 | LOCATION CATEGORY | AMERICA | 2000 |

FIG. 14

| ITEM NUMBER | TYPE | VALUE | VERIFICATION RULE |
|---|---|---|---|
| 1 | ITEM NAME | SALES | 131a,131b,131c,131d,131e,131f,131g |
| 2 | ITEM NAME | VALUE OTHER THAN FOREGOING | 131d,131f,131g |
| 3 | ITEM NAME | NO VALUE | 131d,131f,131g |
| 4 | PRODUCT CATEGORY | HARDWARE | 131b,131d,131e,131f,131g |
| 5 | PRODUCT CATEGORY | SOFTWARE | 131c,131f,131g |
| 6 | PRODUCT CATEGORY | SOLUTIONS | 131a,131f,131g |
| 7 | PRODUCT CATEGORY | VALUE OTHER THAN FOREGOING | 131f,131g |
| 8 | PRODUCT CATEGORY | NO VALUE | 131f,131g |
| 9 | LOCATION CATEGORY | AMERICA | 131a,131b,131c,131d,131e,131f,131g |
| 10 | LOCATION CATEGORY | JAPAN | 131a,131c,131d,131e,131f,131g |
| 11 | LOCATION CATEGORY | VALUE OTHER THAN FOREGOING | 131a,131c,131d,131f,131g |
| 12 | LOCATION CATEGORY | NO VALUE | 131a,131c,131d,131f,131g |

FIG. 15A

| ITEM NUMBER | TYPE | ITEM NAME | VALUE | CANDIDATE |
|---|---|---|---|---|
| 1 | ITEM NAME | | SALES | 131a,131b,131c,131d,131e,131f,131g |
| 2 | PRODUCT CATEGORY | | HARDWARE | 131b,131d,131e,131f,131g |
| 3 | LOCATION CATEGORY | | AMERICA | 131a,131b,131c,131d,131g |

FIG. 15B

| ITEM NUMBER | TYPE | ITEM NAME | VALUE | CANDIDATE |
|---|---|---|---|---|
| 1 | ITEM NAME | | SALES | 131a,131b,131c,131d,131e,131f,131g |
| 2 | PRODUCT CATEGORY | | SOFTWARE | 131c,131f,131g |
| 3 | LOCATION CATEGORY | | JAPAN | 131a,131c,131d,131e,131f,131g |

FIG. 15C

| ITEM NUMBER | ITEM NAME | ITEM NAME | VALUE | CANDIDATE |
|---|---|---|---|---|
| 1 | ITEM NAME | | SALES | 131a,131b,131c,131d,131e,131f,131g |
| 2 | PRODUCT CATEGORY | | SOLUTIONS | 131f,131g |
| 3 | LOCATION CATEGORY | | AMERICA | 131a,131b,131c,131d,131g |

FIG. 16A

| ITEM NUMBER | TYPE | VALUE | CANDIDATE |
|---|---|---|---|
| 1 | ITEM NAME | COST OF SALES | 131d,131f,131g |
| 2 | PRODUCT CATEGORY | HARDWARE | 131b,131d,131e,131f,131g |
| 3 | LOCATION CATEGORY | AMERICA | 131a,131b,131c,131d,131g |

FIG. 16B

| ITEM NUMBER | TYPE | VALUE | CANDIDATE |
|---|---|---|---|
| 1 | ITEM NAME | COST OF SALES | 131d,131f,131g |
| 2 | PRODUCT CATEGORY | SOFTWARE | 131c,131f,131g |
| 3 | LOCATION CATEGORY | JAPAN | 131a,131c,131d,131e,131f,131g |

FIG. 16C

| ITEM NUMBER | TYPE | VALUE | CANDIDATE |
|---|---|---|---|
| 1 | ITEM NAME | COST OF SALES | 131d,131f,131g |
| 2 | PRODUCT CATEGORY | SOLUTIONS | 131a,131f,131g |
| 3 | LOCATION CATEGORY | AMERICA | 131a,131b,131c,131d,131g |

FIG. 17

| ITEM NUMBER | INPUT DATA | COMMON VERIFICATION RULE |
|---|---|---|
| 1 | DATA1 | 131b,131d,131g |
| 2 | DATA2 | 131c,131f,131g |
| 3 | DATA3 | 131a,131g |
| 4 | DATA4 | 131d,131g |
| 5 | DATA5 | 131f,131g |
| 6 | DATA6 | 131g |
| ... | ... | ... |

FIG. 18

| ITEM NUMBER | VERIFICATION RULE | INPUT DATA |
|---|---|---|
| 1 | 131a | DATA3, ... |
| 2 | 131b | DATA1, ... |
| 3 | 131c | DATA2, ... |
| 4 | 131d | DATA1, DATA4, ... |
| 5 | 131e | ... |
| 6 | 131f | DATA2, DATA5, ... |
| 7 | 131g | ALL DATA |

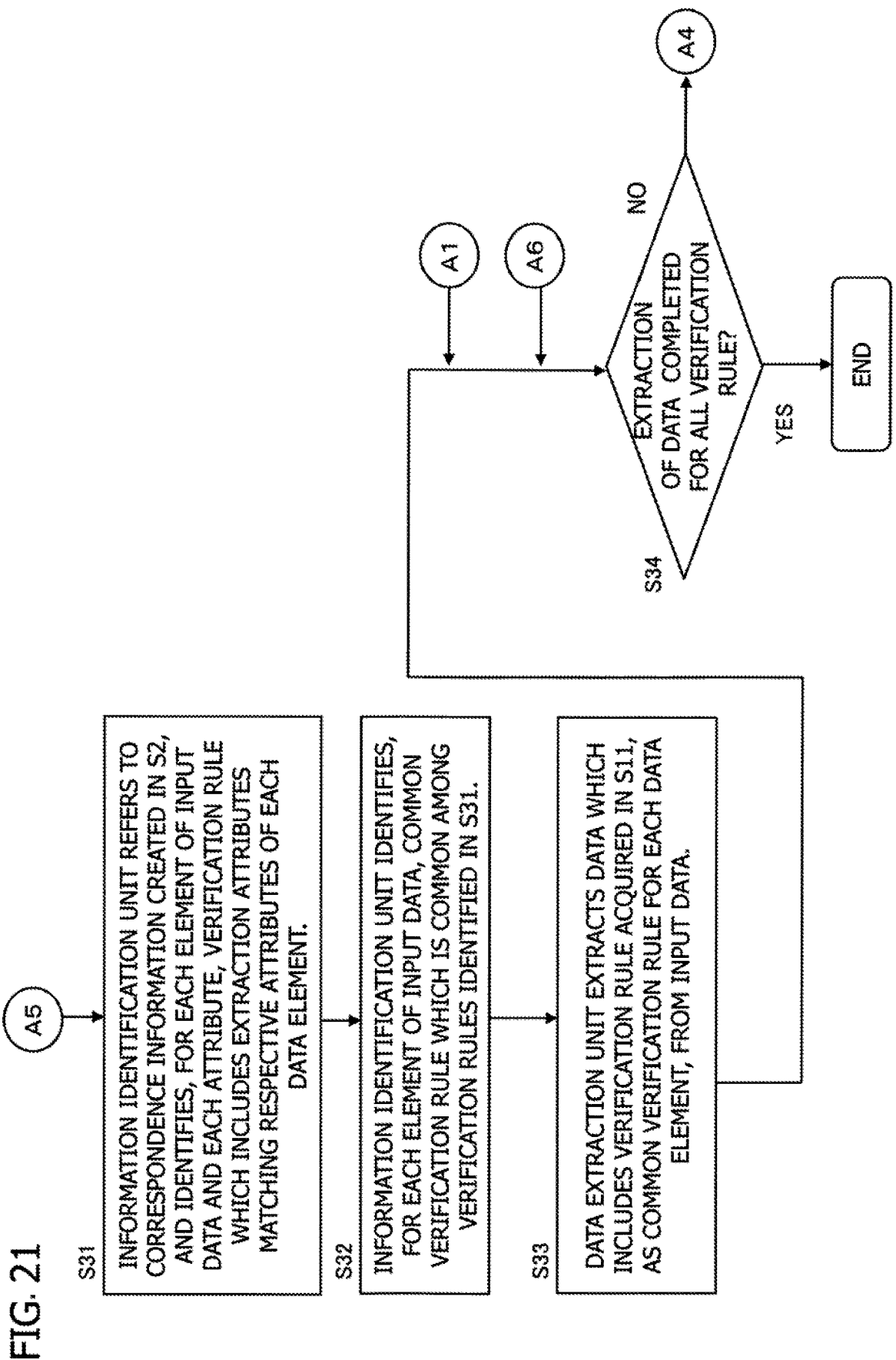

FIG 22A

| ITEM NUMBER | TYPE | VALUE | CANDIDATE |
|---|---|---|---|
| 1 | ITEM NAME | SALES | 131b |
| 2 | PRODUCT CATEGORY | HARDWARE | 131b |
| 3 | LOCATION CATEGORY | AMERICA | 131b |

FIG 22B

| ITEM NUMBER | TYPE | VALUE | CANDIDATE |
|---|---|---|---|
| 1 | ITEM NAME | SALES | 131b |
| 2 | PRODUCT CATEGORY | SOFTWARE | NONE |
| 3 | LOCATION CATEGORY | JAPAN | NONE |

FIG 22C

| ITEM NUMBER | TYPE | VALUE | CANDIDATE |
|---|---|---|---|
| 1 | ITEM NAME | SALES | 131b |
| 2 | PRODUCT CATEGORY | SOLUTIONS | NONE |
| 3 | LOCATION CATEGORY | AMERICA | 131b |

FIG. 23A

| ITEM NUMBER | TYPE | VALUE | CANDIDATE |
|---|---|---|---|
| 1 | ITEM NAME | COST OF SALES | NONE |
| 2 | PRODUCT CATEGORY | HARDWARE | 131b |
| 3 | LOCATION CATEGORY | AMERICA | 131b |

FIG. 23B

| ITEM NUMBER | TYPE | VALUE | CANDIDATE |
|---|---|---|---|
| 1 | ITEM NAME | COST OF SALES | NONE |
| 2 | PRODUCT CATEGORY | SOFTWARE | NONE |
| 3 | LOCATION CATEGORY | JAPAN | NONE |

FIG. 23C

| ITEM NUMBER | TYPE | VALUE | CANDIDATE |
|---|---|---|---|
| 1 | ITEM NAME | COST OF SALES | NONE |
| 2 | PRODUCT CATEGORY | SOLUTIONS | NONE |
| 3 | LOCATION CATEGORY | AMERICA | 131b |

FIG. 24

| ITEM NUMBER | INPUT DATA | COMMON VERIFICATION RULE |
|---|---|---|
| 1 | DATA1 | 131b |
| 2 | DATA2 | NONE |
| 3 | DATA3 | NONE |
| 4 | DATA4 | NONE |
| 5 | DATA5 | NONE |
| 6 | DATA6 | NONE |
| ... | ... | ... |

FIG. 25

| ITEM NUMBER | VERIFICATION RULE | INPUT DATA |
|---|---|---|
| 1 | 131b | DATA1, ... |

FIG. 31

| ITEM NUMBER | INPUT DATA | TYPE | VALUE | COMMON VERIFICATION RULE |
|---|---|---|---|---|
| 1 | DATA1,DATA4 | PRODUCT CATEGORY | HARDWARE | 131b,131d,131g |
|   |             | LOCATION CATEGORY | AMERICA |  |
| 2 | DATA2,DATA5 | PRODUCT CATEGORY | SOFTWARE | 131c,131f,131g |
|   |             | LOCATION CATEGORY | JAPAN |  |
| 3 | DATA3,DATA6 | PRODUCT CATEGORY | SOLUTIONS | 131a,131g |
|   |             | LOCATION CATEGORY | AMERICA |  |

US 10,725,999 B2

EXTRACTION PROGRAM, EXTRACTION DEVICE AND EXTRACTION METHOD

CROSS-REFERENCE TO RELATED APPLICATION

This application is based upon and claims the benefit of priority of the prior Japanese Patent Application No. 2016-048980, filed on Mar. 11, 2016, the entire contents of which are incorporated herein by reference.

FIELD

The present invention relates to an extraction program, an extraction device and an extraction method.

BACKGROUND

For example, a business operator who provides services to a user (also simply called "operator" below) constructs and operates a business system (also called "information processing system" below) suitable for the use, in order to provide various services to a user.

More specifically, the information processing system determines whether or not the contents of input data transmitted from a user, for example, comply with predetermined verification rules. The information processing system transmits verification results relating to the input data, to the user. Thereby, the user is able, for example, to confirm the consistency, etc. of the contents of data that has been created (see, for example, Japanese Laid-open Patent Publication No. 2011-002911 and Japanese Laid-open Patent Publication No. 2006-260056).

SUMMARY

According to an aspect of the embodiments, a non-transitory computer-readable storage medium storing therein an extraction program that causes a computer to execute a process includes: referring to a storage that stores correspondence information associating extraction attributes which match respective attributes of each data element included in a plurality of data elements, from among extraction attributes included in verification rules, and verification rules which include the extraction attributes, and identifying, for each of the plurality of data elements and for each attribute, the verification rule including the extraction attributes matching each attribute; identifying, for each of the plurality of data elements, a common verification rule which is common in the verification rules corresponding to the attributes of each data element; and extracting, for each verification rule, data for which the verification rule has been identified as the common verification rule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for illustrating a specific example of the input data.

FIGS. 4A to 4C are diagrams illustrating specific examples of aspect information corresponding to respective data elements included in the input data.

FIGS. 5A to 5C are diagrams illustrating specific examples of aspect information corresponding to respective data elements included in the input data.

FIGS. 6A to 6F are diagrams illustrating specific examples of the extraction aspect information.

FIG. 7 illustrates a specific example of the extraction result information 135.

FIG. 8 depicts a specific example of the number of data elements to be verified that are extracted by each element of aspect information.

FIG. 14 is a diagram illustrating a specific example of the correspondence information 132.

FIGS. 15A to 15C are diagrams illustrating specific examples of identification candidate information 133.

FIGS. 16A to 16C are diagrams illustrating specific examples of identification candidate information 133.

FIG. 17 is a diagram illustrating specific examples of the common verification rule information 134.

FIG. 18 is a diagram illustrating a specific example of extraction result information 135.

FIG. 21 depicts a flowchart illustrating the details of the extraction process according to the first embodiment.

FIGS. 22A to 22C are diagrams illustrating specific examples of identification candidate information 133.

FIGS. 23A to 23C are diagrams illustrating specific examples of identification candidate information 133.

FIG. 24 is a diagram illustrating specific examples of the common verification rule information 134.

FIG. 25 is a diagram illustrating a specific example of extraction result information 135.

FIG. 31 is a diagram illustrating a specific example of the data group information 139.

DESCRIPTION OF EMBODIMENTS

An information processing system such as that described above extracts data for verification by respective verification rules (called "verification object data" below) from the input data, for example, upon receiving input data from a user. The information processing system then carries out verification of the data to be verified which has been extracted for each verification rule, on the basis of each verification rule. As a result, the information processing system can restrict the processing load associated with verification of the contents of input data.

Here, when the volume of input data received from the user is very large, the processing load on the information processing system when extracting the data to be verified from the input data becomes large. Consequently, if there are a plurality of conditions for extracting the data to be verified (also called "extraction conditions" below), for example, then the information processing system extracts the data to be verified by using an extraction condition which can extract a smaller amount of data (also called "high-efficiency extraction condition" below), before other extraction conditions. Thereby, the information processing system is able to reduce the number of data elements to be extracted by the other extraction conditions, and therefore it is possible to restrict the processing load when extracting data to be verified.

However, if there is no extraction condition of high efficiency, then the information processing system is not able to restrict the processing load when extracting data to be verified. Therefore, the information processing system, in this case, is not able to restrict the processing load associated with verification of the contents of input data. The first embodiment will be explained hereinbelow.

[Configuration of Information Processing System]

Figure 1:
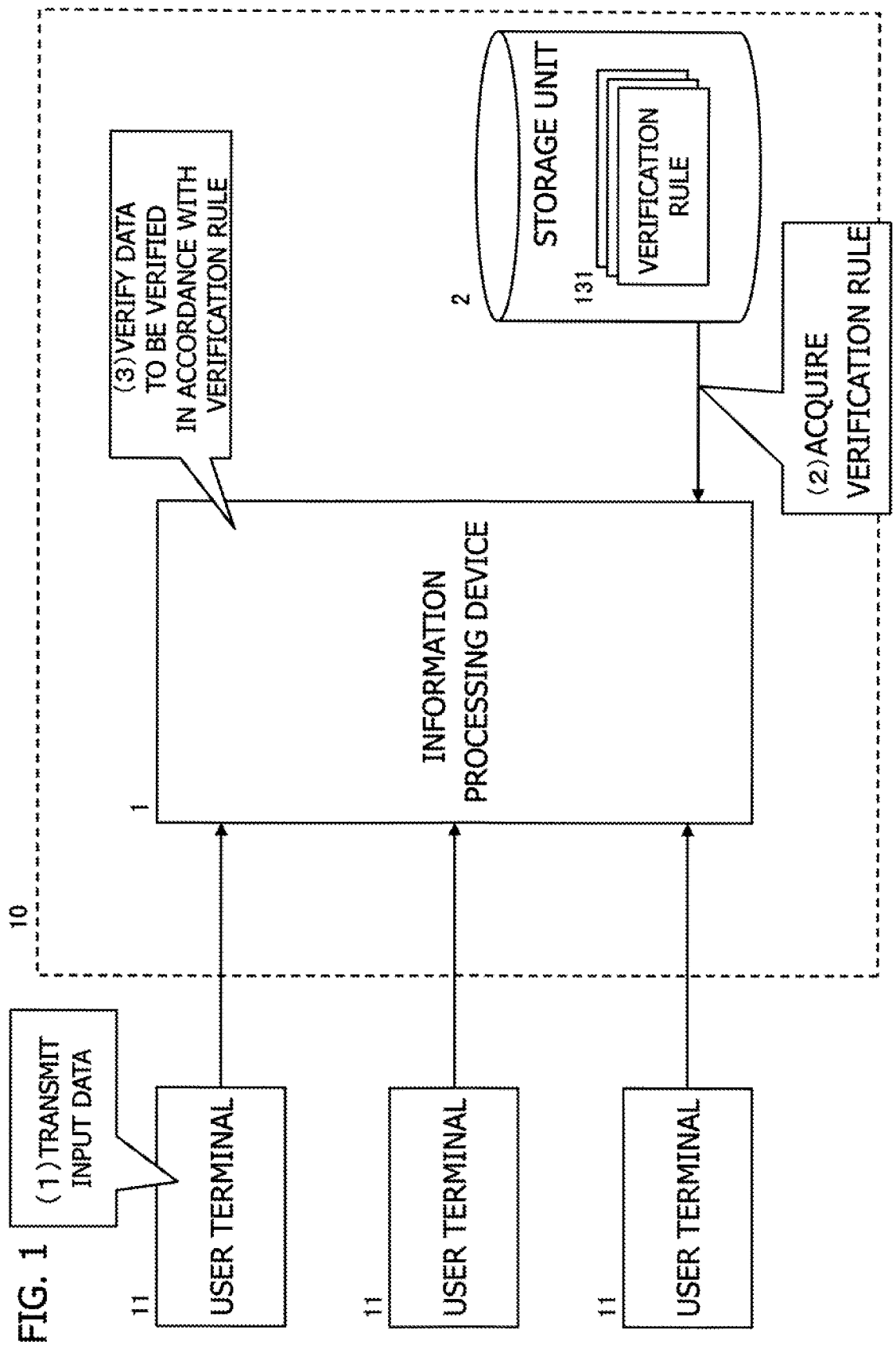
FIG. 1 is a diagram illustrating the configuration of an information processing system 10.

FIG. 1 is a diagram illustrating the configuration of an information processing system 10. The information processing system 10 illustrated in FIG. 1 includes, for example, an information processing device 1 (also called "extraction device 1" below) and a storage unit 2. The information processing device 1 illustrated in FIG. 1 is connected to a plurality of user terminals 11.

The user terminals 11 are terminals used by a user. The user transmits input data of which consistency of the contents, etc. is to be confirmed, to the information processing device 1 via the user terminal 11. The input data transmitted by the user is, for example, data including business information, etc. which needs to have accurate contents. The data transmitted by the user is, for example, data based on the extensible Business Reporting Language (XBRL) format.

When receiving the input data transmitted from the user terminal 11, the information processing device 1 acquires a plurality of verification rules 131 (also called "verification rule information 131" below) stored in the storage unit 2 ((1) and (2) in FIG. 1). These verification rules 131 are predetermined rules for verifying the contents of the input data transmitted from the user terminal 11. The verification rules 131 are, for example, rules written by an XBRL formula, which is a language that defines rules for verifying and calculating the contents of the XBRL data, etc.

The information processing device 1 respectively verifies whether the contents of the input data comply with each of the plurality of verification rules 131 ((3) in FIG. 1). Thereupon, the information processing device 1 transmits the verification result relating to the input data, to the user terminal 11 that transmitted the input data.

[Extraction of Data to be Verified]

Next, the extraction of the data to be verified which is applied to the input data will be described. The information processing device 1 illustrated in FIG. 1, upon receiving input data from the user terminal 11, extracts data to be verified from the input data, for example. Accordingly, the information processing device 1 can restrict the processing volume associated with the verification of the contents of the input data. Below, a specific example of the input data will be explained.

[Specific Example of Input Data]

FIG. 2 is a diagram for illustrating a specific example of the input data. The input data illustrated in FIG. 2 is a specific example of input data received by the information processing device 1 from the user terminal 11. The input data illustrated in FIG. 2 includes, as items, an "item number" which identifies the information included in the input data, a "subject" which identifies the type of each data element included in the input data, and a "value" which is a value set in accordance with the information set in the "subject".

More specifically, in the input data illustrated in FIG. 2, for the information having an "item number" of "1", "sales" is set as the "subject" and "10000000" is set as the "value". Furthermore, in the input data illustrated in FIG. 2, for the information having an "item number" of "4", "cost of sales" is set as the "subject" and "5000000" is set as the "value". The other information included in FIG. 2 is not described here. Below, the elements of information having an "item number" of "1" to "6" which are included in the input data illustrated in FIG. 2 are also respectively called data 1, data 2, data 3, data 4, data 5 and data 6.

The information processing device 1, when extracting data to be verified from the input data, for example, then extracts data satisfying the extraction conditions of each verification rule 131, from the input data, as the data to be verified for each verification rule 131. The information processing device 1 verifies the contents of the data to be verified which has been extracted for each verification rule 131, on the basis of a verification formula included in each of the verification rules 131. A specific example of a verification rule 131 is described below.

[Specific Example of Verification Rule]

Figure 3:
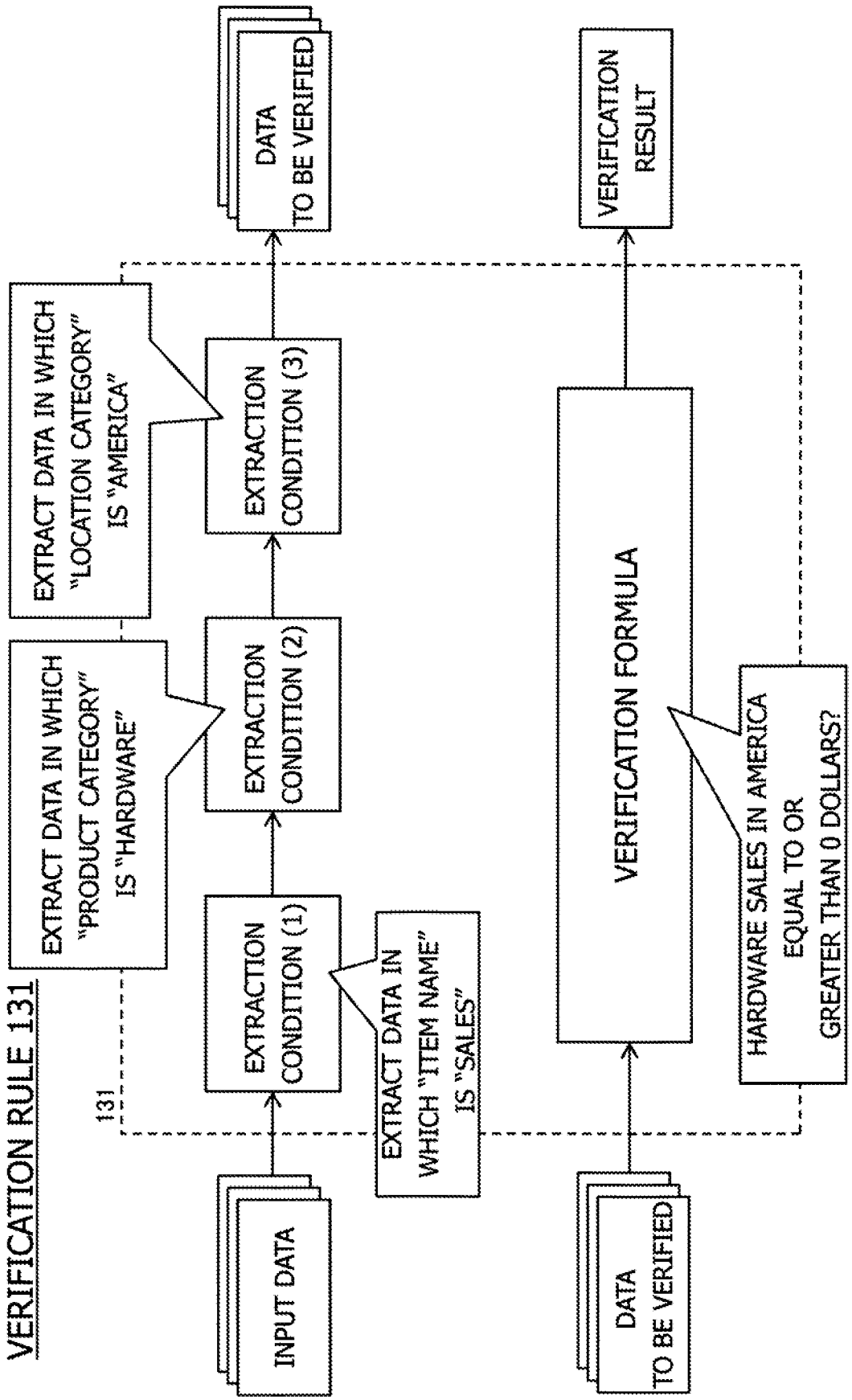
FIG. 3 illustrates one verification rule 131 of the plurality of verification rules 131.

FIG. 3 illustrates one verification rule 131 of the plurality of verification rules 131. The verification rule 131 depicted in FIG. 3 includes an extraction condition (1), and extraction condition (2) and extraction condition (3) and verification formula. The verification formula included in the verification rule 131 is, for example, a formula for detecting an abnormal value set in the input data.

More specifically, the verification formula included in the verification rule 131 illustrated in FIG. 3 is a formula for verifying whether or not hardware sales in America is equal to or greater than 0 dollars, in the contents included in the input data. Accordingly, for example, if it is clear that an amount equal to or greater than 0 dollars is to be set as the hardware sales in America, but an amount less than 0 dollars has been set, then the information processing device 1 can detect that an abnormal value has been set in the input data.

Here, the data verified by the verification formula illustrated in FIG. 3 is only data relating to the sales of hardware in America. In other words, the information processing device 1 does not need to verify the data other than the data relating to the hardware sales in America, by the verification formula indicated in FIG. 3. Therefore, as illustrated in FIG. 3, prior to carrying out verification on the basis of the verification formula, the information processing device 1 extracts and sets as data to be verified only the data relating to the hardware sales in America, by means of an extraction condition included in the verification rule 131. The information processing device 1 then carries out verification of the data to be verified thus extracted, by means of the verification formula.

More specifically, in the example illustrated in FIG. 3, the information processing device 1, upon receiving input data from the user terminal 11, refers to the contents of the extraction condition (1) and extracts the data having an "item name" of "sales", among the attributes corresponding to the respective data elements. The information processing device 1 then refers to the contents of the extraction condition (2) and extracts, from the data extracted by the extraction condition (1), data having a "product category" of "hardware", among the attributes corresponding to the respective data elements. Moreover, the information processing device 1 then refers to the contents of the extraction condition (3) and extracts, from the data extracted by extraction condition (3), data having a "location category" of "America", among the attributes corresponding to the respective data elements.

Thereafter, the information processing device 1 verifies whether or not the hardware sales in America is equal to or greater than 0 dollars, by the verification formula, for each data element extracted by extraction condition (3). The information processing device 1 transmits the verification result to the user terminal 11, for example. Consequently, the information processing device 1 is able to carry out efficient verification of the contents of the input data, by the verification formula.

If, for example, the verification formula includes a plurality of variables, then the information processing device 1 may subject the data extracted by the extraction conditions (1) to (3) to further extraction based on separate extraction conditions for each variable included in the verification formula.

[Details of Extraction of Data to be Verified]

Next, the details of extraction of the data to be verified will be explained. The information processing device 1, when extracting data to be verified for each verification rule 131, compares aspect information, which is information indicating corresponding attributes for each element of input data, and extraction aspect information, which is information indicating attributes included as an extraction condition in each verification rule 131 (called "extraction attribute" below).

More specifically, for example, the operator determines in advance the verification method relating to the contents of the input data, before the data to be verified is extracted from the input data. The operator creates a plurality of verification rules 131 including extraction aspect information in order to verify the contents of input data by the verification method. The information processing device 1, upon receiving input data from the user terminal 11, then extracts the data to be verified for each verification rule 131, by comparing the aspect information corresponding to each data element included in the input data with the extraction aspect information included in each verification rule 131. Specific examples of aspect information corresponding to each data element included in the input data and extraction aspect information which is included in the verification rules 131 are described below.

In the description given below, the aspect information includes an aspect information type, and a value corresponding to each type (condition corresponding to each type). Furthermore, in the description given below, the extraction aspect information includes a type of extraction aspect information data (also called "extraction type" below), and a value corresponding to the extraction type (also called "extraction value" below).

[Specific Example of Aspect Information]

FIGS. 4A to 4C and FIGS. 5A to 5C are diagrams illustrating specific examples of aspect information corresponding to respective data elements included in the input data. The elements of aspect information indicated in FIGS. 4A to 4C and FIGS. 5A to 5C are elements of aspect information corresponding respectively to data 1 to data 6 illustrated in FIG. 2.

The aspect information of data 1 illustrated in FIG. 4A includes, as items, an "item number" which identifies each element of information included in the aspect information of data 1, a "type" in which the type of the aspect information of data 1 is set, and a "value" in which the value corresponding to the information set in "type" is set.

More specifically, in the aspect information of data 1 illustrated in FIG. 4A, in the information element having an "item number" of "1", "item name" is set as the "type", and "sales" is set as the "value". Furthermore, in the aspect information of data 1 illustrated in FIG. 4A, in the information having an "item number" of "2", "product category" is set as the "type" and "hardware" is set as the "value". Moreover, in the information having an "item number" of "3" in the aspect information of data 1 illustrated in FIG. 4A, "location category" is set as the "type" and "America" is set as the "value".

Furthermore, the aspect information indicated in FIG. 4B, FIG. 4C and FIGS. 5A to 5C each have the same items as the aspect information in FIG. 4A. The aspect information illustrated in FIG. 4B, FIG. 4C and FIGS. 5A to 5C is not described here.

In FIGS. 4A to 4C and FIGS. 5A to 5C, a description was given in relation to aspect information having "item name", "product category" and "location category" as the "type", but the aspect information may also have other information corresponding to the "type", such as "duration", "unit", and the like.

[Specific Example of Extraction Aspect Information]

Next, a specific example of the extraction aspect information will be described. FIGS. 6A to 6F are diagrams illustrating specific examples of the extraction aspect information. In the description given below, the verification rules 131a to 131g are stored in the storage unit 2 as verification rules 131. Furthermore, the verification rules 131a to 131f respectively include extraction aspect information 141a to 141f. Moreover, the verification rule 131g does not include extraction aspect information (only includes a verification formula). The extraction aspect information 141a to 141f is also jointly called the extraction aspect 141.

The extraction aspect information 141 depicted in FIGS. 6A to 6F has the same items as the aspect information illustrated in FIGS. 4A to 4C and FIGS. 5A to 5C. More specifically, in the extraction aspect information 141a illustrated in FIG. 6A, for the information having an "item number" of "1", "item name" is set as the "type", and "sales" is set as the "value". Furthermore, in the extraction aspect information 141a depicted in FIG. 6A, for the information having an "item number" of "1", "product category" is set as the "type", and "solutions" is set as the "value". In other words, the extraction aspect information 141a illustrated in FIG. 6A is extraction aspect information 141 for extracting data corresponding to aspect information having an "item name" of "sales" and a "product category" of "solutions".

Furthermore, in the extraction aspect information 141b illustrated in FIG. 6B, for the information having an "item number" of "1", "item name" is set as the "type" and "sales" is set as the "value". Furthermore, in the extraction aspect information 141b illustrated in FIG. 6B, for the information having an "item number" of "2", "product category" is set as the "type", and "hardware" is set as the "value". In the extraction aspect information 141b illustrated in FIG. 6B, for the information having an "item number" of "3", "location category" is set as the "type", and "America" is set as the "value". In other words, the extraction aspect information 141b illustrated in FIG. 6B is extraction aspect information 141 for extracting data corresponding to aspect information having an "item name" of "sales", a "product category" of "hardware" and a "location category" of "America".

Moreover, in the extraction aspect information 141f depicted in FIG. 6F, for the information having an "item number" of "1", "location category" is set as the "type" and "Not America", which indicates all values except for "America" is set as the "value". In other words, the extraction aspect information 141f illustrated in FIG. 6F is extraction aspect information 141 for extracting data corresponding to aspect information in which a value other than "America" is set in "location category".

[Specific Example of Extraction Result Information]

Next, a specific example of an extraction result for data to be verified (also called "extraction result information 135") based on the extraction aspect information 141 will be described. FIG. 7 illustrates a specific example of the extraction result information 135.

The extraction result information 135 illustrated in FIG. 7 includes, as items, "item number" which identifies each element of information included in the extraction result information 135, "verification rule" in which information identifying a verification rule 131 is set, and "input data" in which information indicating the respective data elements included in the input data is set.

More specifically, in the aspect information illustrated in FIGS. 4A to 4C and FIGS. 5A to 5C, the "value" of information having a "type" which is "item name" is, respectively: "sales", "sales", "sales", "cost of sales", "cost of sales" and "cost of sales". Furthermore, in the aspect information illustrated in FIGS. 4A to 4C and FIGS. 5A to 5C, the "value" of information having a "type" which is "product category" is, respectively: "hardware", "software", "solutions", "hardware", "software" and "solutions". The extraction aspect information 141a depicted in FIG. 6A includes extraction attributes in which "item name" is set as the "type", and "sales" is set as the "value". Furthermore, the extraction aspect information 141a depicted in FIG. 6A also includes extraction attributes in which "product category" is set as the "type", and "solutions" is set as the "value".

Consequently, the extraction aspect information 141a illustrated in FIG. 6A matches only the aspect information illustrated in FIG. 4C. Therefore, as illustrated in FIG. 7, the information processing device 1 sets "131a", which indicates the verification rule 131a including the extraction aspect information 141a illustrated in FIG. 6A, as the "verification rule" for information having an "item number" of "1". The information processing device 1 then sets "data 3" or the like which indicates data corresponding to the aspect information illustrated in FIG. 4C, in the "input data" of the information having an "item number" of "1".

The verification rule 131g does not include extraction aspect information 141. Therefore, when data is extracted from the input data illustrated in FIG. 2, by the verification rule 131g, all of the data included in the input data is extracted. Consequently, as illustrated in FIG. 7, the information processing device 1 sets "all data" which indicates all of the data included in the input data, as the "input data" of the information for which the "verification rule" is "131g". The other information included in FIG. 7 is not described here.

Here, when the volume of input data received from the user is very large, the processing load on the information processing device 1 when extracting data to be verified becomes large. Therefore, if there are a plurality of extraction attributes corresponding to each verification rule 131, for example, then the information processing device 1 carries out the extraction of data to be verified by using an extraction attribute by which a smaller amount of data can be extracted (also called a "high-efficiency extraction attribute" below), before other extraction attributes. Consequently, the information processing system can restrict the processing load when extracting data to be verified. A description of a high-efficiency extraction attribute is given below.

[High-Efficiency Extraction Attribute]

FIG. 8 depicts a specific example of the number of data elements to be verified that are extracted by each element of aspect information. The information illustrated in FIG. 8 includes the same items as the extraction aspect information 141 illustrated in FIGS. 6A to 6F. Furthermore, the information illustrated in FIG. 8 also includes, as an item, "number of data elements", which is set to the number of data elements extracted from the input data on the basis of each extraction attribute included in the extraction aspect information. In the example illustrated in FIG. 8, 10,000 data elements is included in the input data.

More specifically, in the information illustrated in FIG. 8, the "number of data elements" of information having a "type" which is "item name" and a "value" which is "sales" (information having an "item number" of "1") is set to "6000 (data elements)". More specifically, the information having an "item number" of "1" in the information depicted in FIG. 8 indicates that when data is extracted from the input data by an extraction attribute in which the "type" is "item name" and the "value" is "sales", then 6000 data elements are extracted.

Therefore, when extracting data by using the extraction aspect information 141b illustrated in FIG. 6B, if the extraction of data is carried out firstly by using the extraction attribute in which the "type" is "item name" and the "value" is "sales", then the information processing device 1 extracts 6000 data elements, for example. Therefore, in this case, further extraction of data based on another extraction attribute is carried out on 6000 data elements.

On the other hand, when extracting data by using the extraction aspect information 141b illustrated in FIG. 6B, if the extraction of data is carried out firstly by using the extraction attribute in which the "type" is "location category" and the "value" is "America", then the information processing device 1 extracts 2000 data elements, for example. Therefore, in this case, further extraction of data based on another extraction attribute is carried out on 2000 data elements.

In other words, when extracting data from the input data by the verification rule 131, the information processing device 1 is able to restrict the processing load when extracting the data to be verified from the input data, by carrying out first the extraction on the basis of the high-efficiency extraction attribute. The other information included in FIG. 8 is not described here.

However, if there is no high-efficiency extraction attribute in each of the verification rules 131, then the information processing device 1 is not able to restrict the processing load when extracting the data to be verified. Therefore, the information processing device 1, in this case, is not able to restrict the processing load associated with verification of the contents of the input data.

Therefore, the information processing device 1 according to the present embodiment refers to correspondence information which associates, among the extraction attributes included in the verification rules 131, the extraction attributes that match each of the attributes of the data elements included in the input data (also called "plurality of data elements" below), and the verification rule information 131 included each extraction attribute, and for each element of input data and each attribute, determines whether or not the attributes of the data element match the extraction attribute. The information processing device 1 then identifies, for each element of input data, verification rule information (also called "common verification rule information" below) that includes each of the extraction attributes determined to match the attributes of the data element. Thereafter, the information processing device 1 extracts, for each element of verification rule information 131, data for which that verification rule information 131 has been identified as common verification rule information.

In other words, by creating correspondence information in advance, the information processing device 1 can extract data corresponding to each element of verification rule information 131, without directly comparing the aspect information corresponding to the input data and the extraction aspect information 141 included in the verification rule 131. Therefore, the information processing device 1 can extract data on the basis of a stable processing volume which corresponds to the number of input data.

Consequently, the information processing device 1 is able to carry out the extraction of data from the input data efficiently, even if there is verification rule information 131 in which there is no high-efficiency extraction attribute.

[Hardware Configuration of Information Processing Device]

Figure 9:
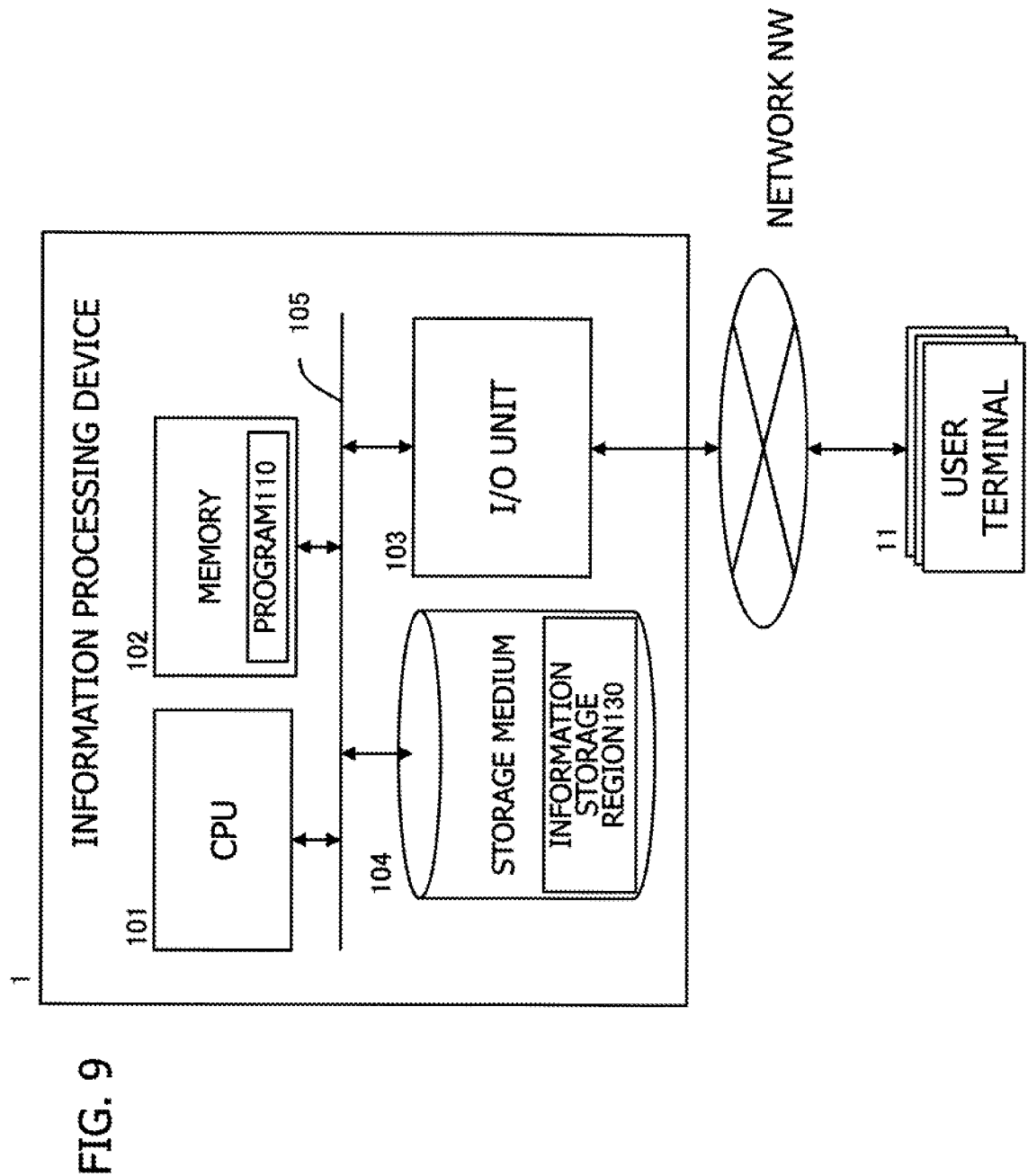
FIG. 9 illustrates one example of a hardware configuration of the information processing device 1.

Next, the hardware configuration of the information processing device 1 will be described. FIG. 9 illustrates one example of a hardware configuration of the information processing device 1.

The information processing device 1 has a CPU 101, which is a processor, a memory 102, an external interface (I/O unit) 103, and a storage medium 104. The units are mutually connected via a bus 105.

The storage medium 104, for example, stores a program 110 for carrying out a process of extracting data to be verified from the input data (also called "extraction process" below), in a program storage region (not illustrated) of the storage medium 104. Furthermore, the storage medium 104 has an information storage region 130 (also called "storage unit 130" below) which stores information to be used when carrying out the extraction process. The information storage region 130 corresponds to the storage unit 2 illustrated in FIG. 1, etc.

As illustrated in FIG. 9, when executing the program 110, the CPU 101 loads the program 110 from the storage medium 104 to the memory 102, and carries out the extraction process in conjunction with the program 110. Furthermore, the external interface 103 communicates with the user terminal 11 via a network NW comprising an intranet, or the Internet, etc., for example.

[Functions of Information Processing Device]

Figure 10:
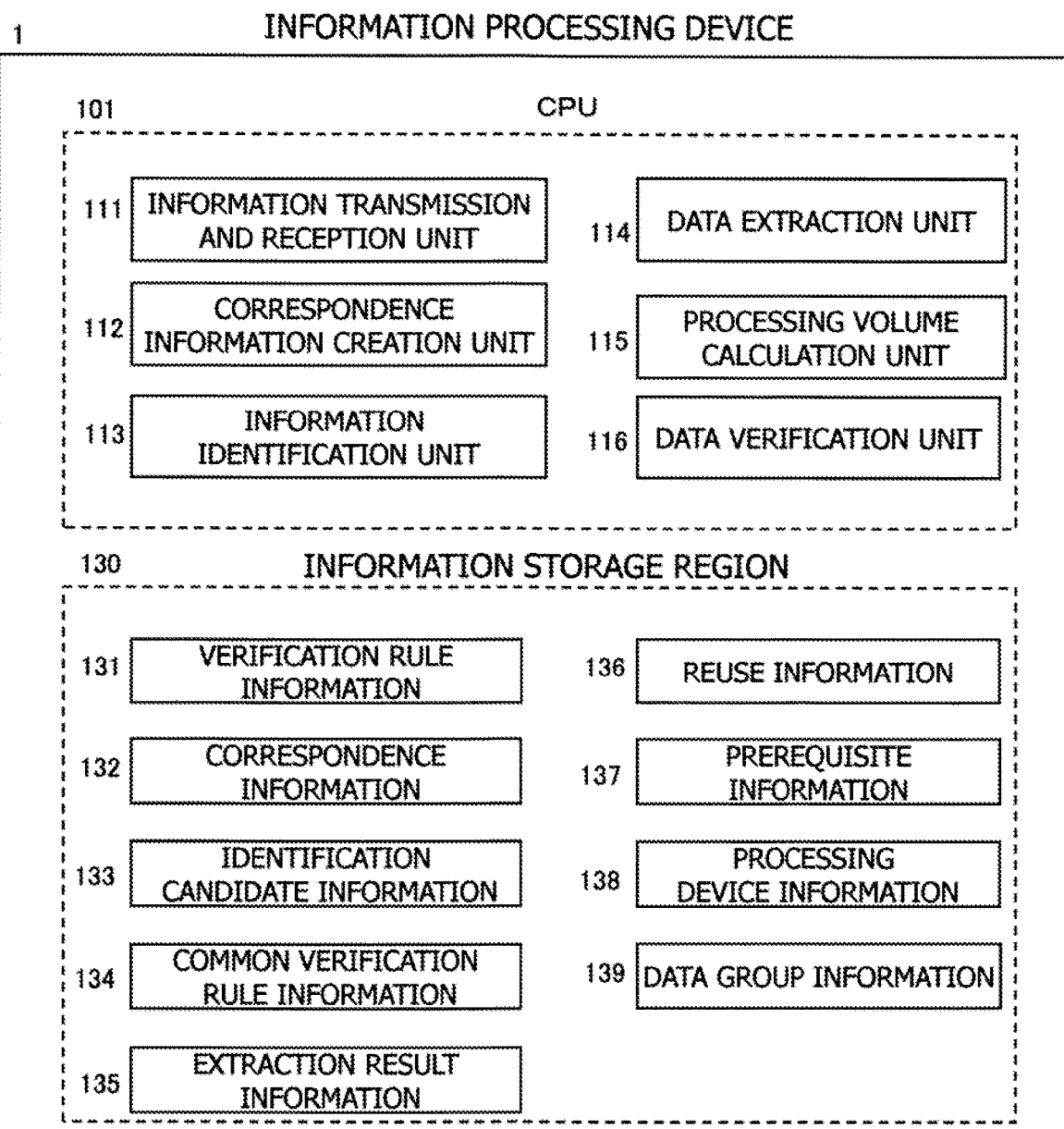
FIG. 10 is a functional block diagram of the information processing device 1.

Next, the functions of the information processing device 1 are explained. FIG. 10 is a functional block diagram of the information processing device 1.

The CPU 101 of the information processing device 1, by working in conjunction with the program 110, operates, for example, as an information transmission and reception unit 111, a correspondence information creation unit 112 (also simply called "creation unit 112" below), and an information identification unit 113 (also simply called "identification unit 113" below). Furthermore, the CPU 101 of the information processing device 1, by working in conjunction with the program 110, operates, for example, as a data extraction unit 114 (also simply called "extraction unit 114" below), a processing volume calculation unit 115, and a data verification unit 116. Moreover, verification rule information 131, correspondence information 132, identification candidate information 133, common verification rule information 134, extraction result information 135, reuse information 136, prerequisite information 137, processing volume information 138 and data group information 139 are also stored in the information storage region 130.

The information transmission and reception unit 111 receives input data transmitted by the user via the user terminal 11. Furthermore, the information transmission and reception unit 111 transmits a verification result produced by the data verification unit 116 based on the data to be verified, to the user terminal 11.

The correspondence information creation unit 112 creates correspondence information 132, for example, before receiving the input data from the user terminal 11. The correspondence information 132 is information which associates extraction attributes that match the attributes of each data element included in the input data, with verification rule information 131 which includes the extraction attributes. More specifically, the correspondence information 132 is information which associates the states of the values of the attributes of each data element that is expected to be included in the input data, with verification rule information 131 which includes extraction attributes (individual conditions included in the extraction aspect information) that permit the states of the values. The correspondence information creation unit 112, for example, stores the created correspondence information 132 in the information storage region 130.

When extracting data from the input data, the information identification unit 113 refers to the correspondence information 132 and identifies, for each element of input data and for each attribute, verification rule information 131 that includes extraction attributes matching the respective attributes of each data element. The information identification unit 113 then identifies, for each element of input data, common verification rule information 134 which is common among the identified verification rules. Moreover, the information identification unit 113, for example, stores the identified common verification rule information 134 in the information storage region 130.

The data extraction unit 114 extracts data from the input data on the basis of the extraction attributes included in the verification rule information 131. More specifically, the data extraction unit 114 refers to the common verification rule information 134 stored in the information storage region 130 and, for each verification rule information 131, extracts the data for which that verification rule information 131 has been identified as common verification rule information 134. The data extraction unit 114, for example, stores information indicating data to be verified that has been extracted from the input data, as extraction result information 135, in the information storage region 130.

The processing volume calculation unit 115 determines whether or not the correspondence information 132 stored in the information storage region 130 includes information about verification rule information 131 which includes all of the extraction attributes included in the other verification rule information 131. The processing volume calculation unit 115 then calculates the processing volume (also called "processing volume information 138") that is needed in order to determine whether or not input data is to be extracted on the basis of extraction attributes that are included in the verification rule information 131 that is determined to be present in the correspondence information but are not included in the other verification rule information 131. The details of the process by the processing volume calculation unit 115 are described below.

The data verification unit 116 carries out verification of the data to be verified which has been extracted from the input data, by means of the verification formula included in the respective elements of verification rule information 131, for example. The data verification unit 116 then creates a verification result by means of the verification formula. The data verification unit 116 may store the created verification result in the information storage region 130. The identification candidate information 133, the reuse information 136, the prerequisite information 137 and the data group information 139 are described hereinafter.

First Embodiment

Figure 11:
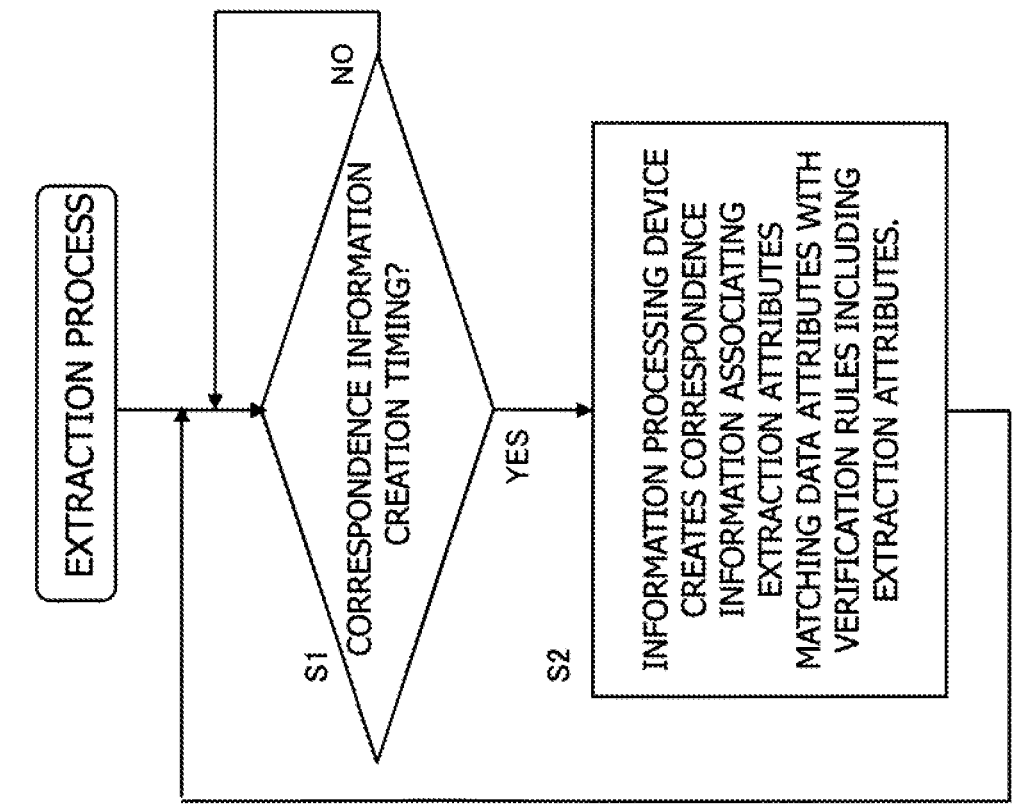
FIG. 11 is flowcharts illustrating an overview of an extraction process according to the first embodiment.
Figure 12:
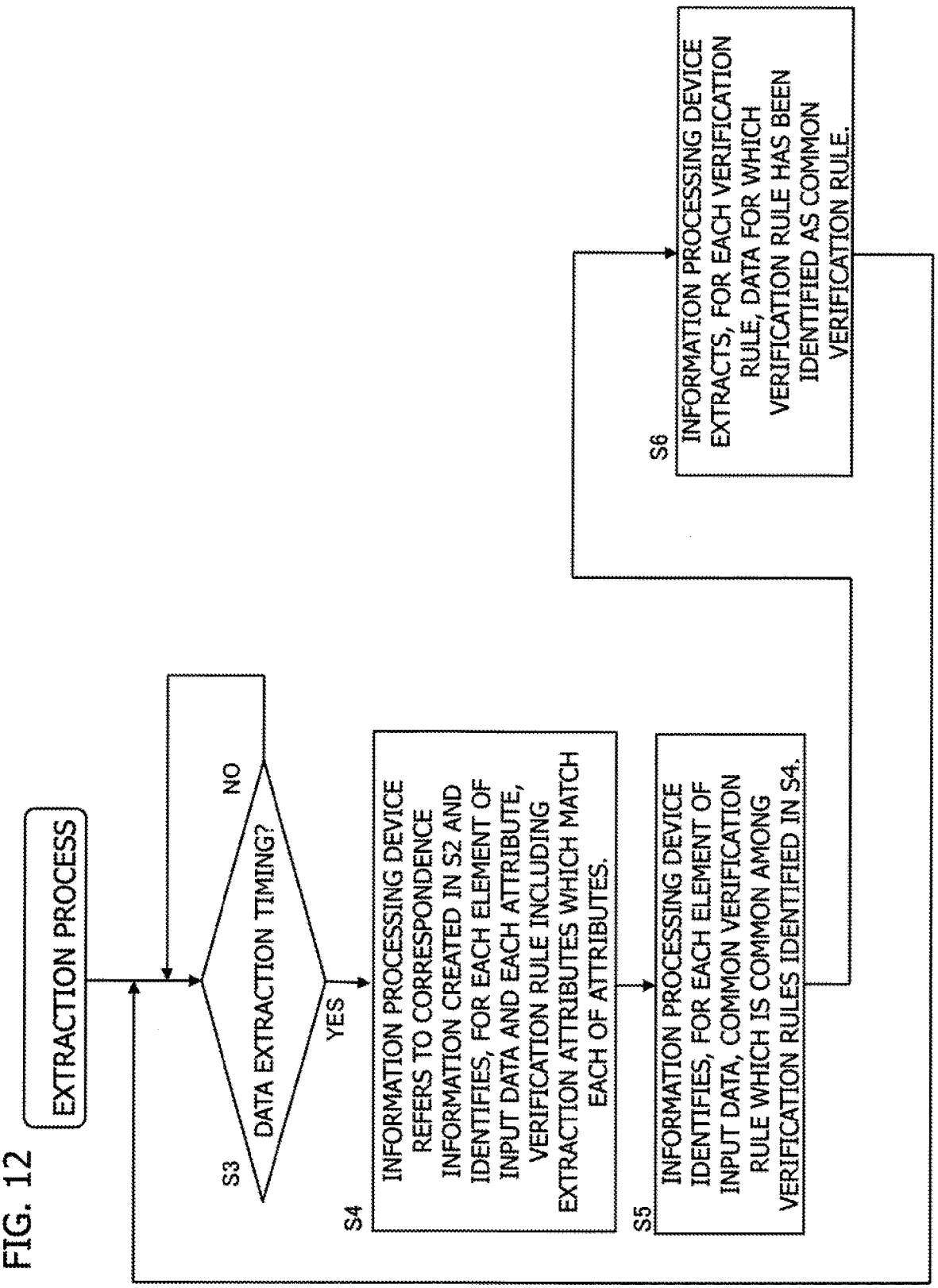
FIG. 12 is flowcharts illustrating an overview of an extraction process according to the first embodiment.
Figure 13:
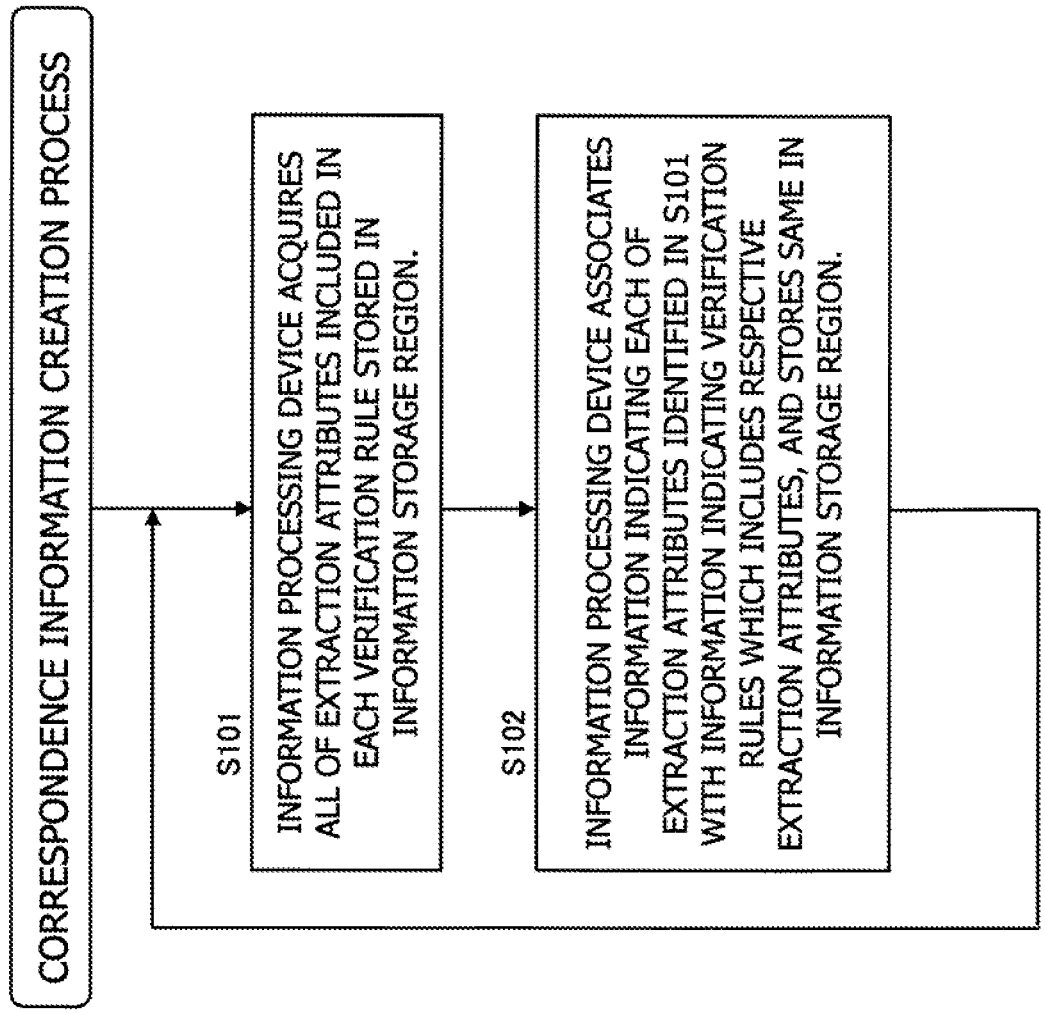
FIG. 13 is flowcharts illustrating an overview of an extraction process according to the first embodiment.

Next, a first embodiment will be described. FIG. 11 to FIG. 13 are flowcharts illustrating an overview of an extraction process according to the first embodiment. Furthermore, FIG. 14 to FIG. 16C are diagrams illustrating an overview of an extraction process according to the first embodiment. An overview of the extraction process from FIG. 11 to FIG. 13 is described here with reference to FIG. 14 to FIG. 16C.

As illustrated in FIG. 11, the information processing device 1 waits until a correspondence information creation timing (NO at S1). The correspondence information creation timing may be, for instance, a timing at which the operator makes an input to the information processing device 1 indicating the creation of correspondence information 132.

Thereupon, when the correspondence information creation timing is reached (YES at S1), the information processing device 1 creates correspondence information 132 which associates extraction attributes matching the attributes of each of the data elements included in the input data, with verification rule information 131 that includes the extraction attributes (S2). More specifically, the correspondence information 132 is information which associates the states of the values of the attributes of each data element that is expected to be included in the input data, with verification rule information 131 that permits the states of the values.

The details of the process in S2 are described below.

[Details of Process in S2]

FIG. 13 is a flowchart illustrating a process for creating correspondence information 132 (also called "correspondence information creation process" below).

As illustrated in FIG. 13, the information processing device 1 acquires all of the extraction attributes included in respective elements of verification rule information 131 stored in the information storage region 130 (S101). More specifically, the information processing device 1, for example, acquires the information set in "type" in the extraction aspect information 141a to 141f illustrated in FIGS. 6A to 6F, and the information set in "value" thereof, in associated fashion. The information processing device 1 then stores correspondence information 132 which associates information indicating each of the extraction attributes identified in the process in S101, with information indicating the verification rule information 131 including each of the extraction attributes, in the information storage region 130 (S102). More specifically, the correspondence information 132 is information which associates the states of the values of the attributes of each data element that may be expected to be included in the input data, with the verification rule information 131 which includes extraction attributes which permit the states of the respective values (individual conditions included in the extraction aspect information). A specific example of the correspondence information 132 created by the correspondence information creation process is described below.

[Specific Example of Correspondence Information]

FIG. 14 is a diagram illustrating a specific example of the correspondence information 132. The correspondence information 132 illustrated in FIG. 14 includes, as items, "item number" which identifies each element of information included in the correspondence information 132, "type" which sets the extraction type of the extraction aspect information 141, "value" which sets the variation in the value extracted from all of the extraction attributes, and "verification rule" which sets verification rules. A case is described below in which data is extracted from the input data illustrated in FIG. 2, on the basis of the verification rule information 131a to 131f which respectively include the extraction aspect information 141a to 141f depicted in FIGS. 6A to 6F, and the verification rule information 131g which does not include extraction aspect information 141.

There are no extraction attributes which mention a "value" other than "sales" for the extraction aspect information 141 depicted in FIGS. 6A to 6F in which the "type" is "item name". However, in actual input data, it is imagined that there are also values other than "sales". Therefore, below, a special value, "value other than foregoing" is introduced in order to jointly handle all values which are not mentioned explicitly in the extraction aspect information 141. Furthermore, below, there are cases where, depending on the type of aspect information, the aspect information does not actually exist, and therefore the special value "no value" is also introduced.

Of the extraction aspect information 141 depicted in FIGS. 6A to 6F, information in which the "type" is "item name" and the "value" is "sales" is set in the extraction aspect information 141a, 141b, 141c and 141e. The extraction aspect information 141a, 141b, 141c and 141e is included respectively in the verification rule information 131a, 131b, 131c and 131e. Therefore, as illustrated in FIG. 14, the information processing device 1 sets the "verification rule" for the information of which the "type" is "item name" and the "value" is "sales" to "131a", "131b", "131c" and "131e", which respectively indicate the verification rule information 131a, 131b, 131c and 131e.

Furthermore, in the extraction aspect information 141 depicted in FIGS. 6A to 6F, information in which the "type" is "item name" and the "value" is a value other than "sales" is not set in the extraction aspect information 141a, 141b, 141c and 141e. Therefore, as illustrated in FIG. 14, the information processing device 1, based on the definition of "value other than foregoing", does not set "131a", "131b", "131c" and "131e", which respectively indicate the verification rule information 131a, 131b, 131c and 131e, as the "verification rule" for information in which the "type" is "item name" and the "value" is "value other than foregoing". Moreover, in the extraction aspect information 141 depicted in FIGS. 6A to 6F, information in which the "type" is "item name" and the "value" is "sales" is set in the verification rule information 131*a*, 131*b*, 131*c* and 131*e*. Therefore, as illustrated in FIG. 14, the information processing device 1, based on the definition of "no value", does not set "131*a*", "131*b*", "131*c*" and "131*e*", which respectively indicate the verification rule information 131*a*, 131*b*, 131*c* and 131*e*, as the "verification rule" for information in which the "type" is "item name" and the "value" is "no value".

On the other hand, in the extraction aspect information 141 depicted in FIGS. 6A to 6F, the extraction aspect information 141*d*, 141*f* does not include information in which the "type" is "item name". Furthermore, the verification rule information 131*g* does not include extraction aspect information 141. In other words, the information processing device 1 extracts data regardless of the contents of the information set in "item name", when extracting data from the input data on the basis of the verification rule information 131*d*, 131*f* or 131*g*. Consequently, as illustrated in FIG. 14, the information processing device 1 sets "131*d*", "131*f*" and "131*g*" which respectively indicate the verification rule information 131*d*, 131*f* and 131*g*, as the "verification rule" for each element of information in which the "type" is "item name" (the information elements having an "item number" from "1" to "3"). The other information illustrated in FIG. 14 is not described here.

Returning to FIG. 12, the information processing device 1 waits until reaching a data extraction timing (NO at S3). The data extraction timing may be, for example, a timing at which input data is received by the information processing device 1 from the user terminal 11. When the data extraction timing has been reached (YES in S3), the information processing device 1 refers to the correspondence information 132 when extracting data from the input data, and identifies, for each element of input data and for each attribute, the verification rule information 131 including extraction attributes matching the respective attributes of each of the data elements (the verification rule information 131 including extraction attributes satisfying each of the data attributes) (S4). More specifically, the information processing device 1 creates identification candidate information 133 indicating whether or not each of the attributes of the data elements matches each of the extraction attributes, and stores this information in the information storage region 130. A specific example of identification candidate information 133 is described below.

[Specific Example of Identification Candidate Information]

FIGS. 15A to 15C, FIGS. 16A to 16C, FIGS. 22A to 22C and FIGS. 23A to 23C are diagrams illustrating specific examples of identification candidate information 133. The identification candidate information 133*a* to 133*f* illustrated in FIGS. 15A to 15C and FIGS. 16A to 16C is information corresponding respectively to data 1 to data 6 included in the input data illustrated in FIG. 2. Furthermore, the identification candidate information 133*a* to 133*f* illustrated in FIGS. 22A to 22C and FIGS. 23A to 23C is information indicating a state during creation of the identification candidate information 133*a* to 133*f* illustrated in FIGS. 15A to 15C and FIGS. 16A to 16C. FIGS. 22A to 22C and FIGS. 23A to 23C are described below.

The identification candidate information 133*a* illustrated in FIG. 15A has the same items as the aspect information corresponding to each data element included in the input data depicted in FIGS. 4A to 4C and FIGS. 5A to 5C. Furthermore, the identification candidate information 133*a* illustrated in FIG. 15A has, as an item, "candidate", which sets verification rule information 131 that is a candidate for common verification rule information 134.

More specifically, the information processing device 1, in the process in S4, sets the "type" and "value" of the identification candidate information 133*a* illustrated in FIG. 15A to the same information as that set in the "type" and "value" of the aspect information illustrated in FIG. 4A. In other words, the information processing device 1 sets "item name" as the "type" and "sales" as the "value", in the information having an "item number" of "1". Furthermore, the information processing device 1 sets "product category" as the "type" and "hardware" as the "value", in the information having an "item number" of "2". Moreover, the information processing device 1 sets "location category" as the "type" and "America" as the "value", in the information having an "item number" of "3".

Thereupon, the information processing device 1 identifies information, in the correspondence information 132 illustrated in FIG. 14, which is set to the same "verification rule" information as the information set in "type" and "value" in the identification candidate information 133*a* illustrated in FIG. 15A. The information processing device 1 sets the identified information as the "candidate" in the identification candidate information 133*a* illustrated in FIG. 15A.

In other words, in the identification candidate information 133*a* illustrated in FIG. 15A, "item name" and "sales" are set as the "type" and "value" of the information of which the "item number" is "1". Consequently, the information processing device 1 identifies the information, which is the information set as the "verification rule" of the information in which the "item name" and "sales" are set (the information having an "item number" of "1"), in the correspondence information 132 illustrated in FIG. 14. The information processing device 1 then sets the identified information as a "candidate" for the information having an "item number" of "1", as illustrated in FIG. 15A. The remainder of the information included in FIG. 15A is not described here.

Furthermore, the identification candidate information 133*b* to 131*f* illustrated in FIG. 15B, FIG. 15C and FIGS. 16A to 16C has the same items as the identification candidate information 133*a* illustrated in FIG. 15A. The respective information elements included in the identification candidate information 133*a* illustrated in FIG. 15B, FIG. 15C and FIGS. 16A to 16C are not described here.

Returning to FIG. 12, the information processing device 1 identifies, for each element of input data, common verification rule information 134, which is verification rule information 131 that is common among the elements of verification rule information 131 identified by the process in S4 (S5). The information processing device 1, for example, stores the identified common verification rule information 134 in the information storage region 130. A specific example of the common verification rule information 134 is described below.

[Specific Example of Common Verification Rule Information]

FIG. 17 and FIG. 24 are diagrams illustrating specific examples of the common verification rule information 134. The common verification rule information 134 illustrated in FIG. 17 includes, as items, "item number" which identifies each element of information included in the common verification rule information 134, "input data" which indicates each data element included in the input data, and "common verification rule" which sets common verification rule information 134. Furthermore, the common verification rule information 134 illustrated in FIG. 24 is information indicating a state during creation of the common verification rule information 134 illustrated in FIG. 17. A description of FIG. 24 is given below.

More specifically, in the identification candidate information 133a illustrated in FIG. 15A, the common information among the respective elements of information set in "candidate" for the information elements having an "item number" from "1" to "3" is 131b, 131d and 131g. Therefore, as illustrated in FIG. 17, the information processing device 1 sets the "common verification rule" for the information of which "input data" is "data 1" (the information having "item number" of "1"), to "131b", "131d" and "131g".

In other words, the aspect information illustrated in FIG. 4A is information which matches each of the elements of the extraction aspect information 141b, 141d and 141g illustrated in FIGS. 6A to 6F. The extraction aspect information 141b, 141d and 141g is information that is included in the verification rule information 131b, 131d and 131g. Consequently, the information having an "item number" of "1" in the common verification rule information 134 illustrated in FIG. 17 indicates that the data 1 illustrated in FIG. 2 is extracted by the verification rule information 131b, 131d and 131g illustrated in FIGS. 6A to 6F. The remainder of the information included in FIG. 17 is not described here.

Returning to FIG. 12, the information processing device 1 extracts, for each element of verification rule information 131, data for which that verification rule information 131 is identified as common verification rule information 134 (S6). In other words, the information processing device 1 creates extraction result information 135 which indicates data in which each verification rule information 131 is identified as common verification rule information 134. The information processing device 1 then stores the created extraction result information 135 in the information storage region 130, for example. A specific example of extraction result information 135 is described below.

[Specific Example of Extraction Result Information]

FIG. 18 and FIG. 25 are diagrams illustrating a specific example of extraction result information 135. The extraction result information 135 illustrated in FIG. 18 includes, as items, an "item number" which identifies the information elements included in the extraction result information 135, "verification rule" which sets the verification rule information 131, and "input data" which identifies each data element included in the input data. Furthermore, the extraction result information 135 illustrated in FIG. 25 is information depicting a state during creation of the extraction result information 135 illustrated in FIG. 18. A description of FIG. 25 is given below.

More specifically, in the common verification rule information 134 illustrated in FIG. 17, the information set as "input data" of the information in which "common verification rule" is set to "131a" is the information having "item number" set to "3". Consequently, as illustrated in FIG. 18, the information processing device 1 sets "data 3", etc. for the "input data" of the information in which "verification rule" is "131a" (the information having an "item number" of "1"). In other words, the information processing device 1 identifies that data 3 is the data extracted by the verification rule information 131a, from among the input data depicted in FIG. 2. The remainder of the information included in FIG. 18 is not described here.

In this way, the information processing device 1 according to the present embodiment creates correspondence information 132 which associates the extraction attributes matching the respective attributes of each data element included in the input data, with verification rule information 131 that includes each extraction attribute. Thereupon, when extracting data from input data, the information processing device 1 refers to the correspondence information 132, and determines, for each element of input data and each attribute, whether or not the attribute of the data element matches each of the extraction attributes. Moreover, the information processing device 1 identifies, for each element of input data, common verification rule information 134 which includes each of the extraction attributes determined to match the respective attributes of each data element. Thereupon, the information processing device 1 extracts, for each element of verification rule information 131, data in which the verification rule information 131 has been identified as common verification rule information 134.

In other words, by creating the correspondence information 132 in advance, the information processing device 1 is able to extract data corresponding to each element of verification rule information 131, without directly comparing the aspect information corresponding to the input data and the extraction aspect information 141 included in the verification rule 131. Accordingly, the information processing device 1 can extract data based on a stable processing volume which corresponds to the number of data elements in the input data.

Consequently, the information processing device 1 can extract data efficiently from the input data, even in cases where there is verification rule information 131 for which no high-efficiency extraction attribute exists.

When there are a plurality of elements of verification rule information 131 which include the same extraction attributes, the information processing device 1, in the process in S4, may identify the verification rule information 131 by regarding that only the element of one of the plurality of elements of verification rule information 131 is included in the correspondence information 132. Moreover, the information processing device 1 may extract data, in the process in S6, by regarding that data for which the element of one of the plurality of elements of the verification rule information 131 has been identified as the common verification rule information 134 is data for which each of the plurality of elements of verification rule information 131 has been identified as the common verification rule information 134.

Details of First Embodiment

Figure 19:
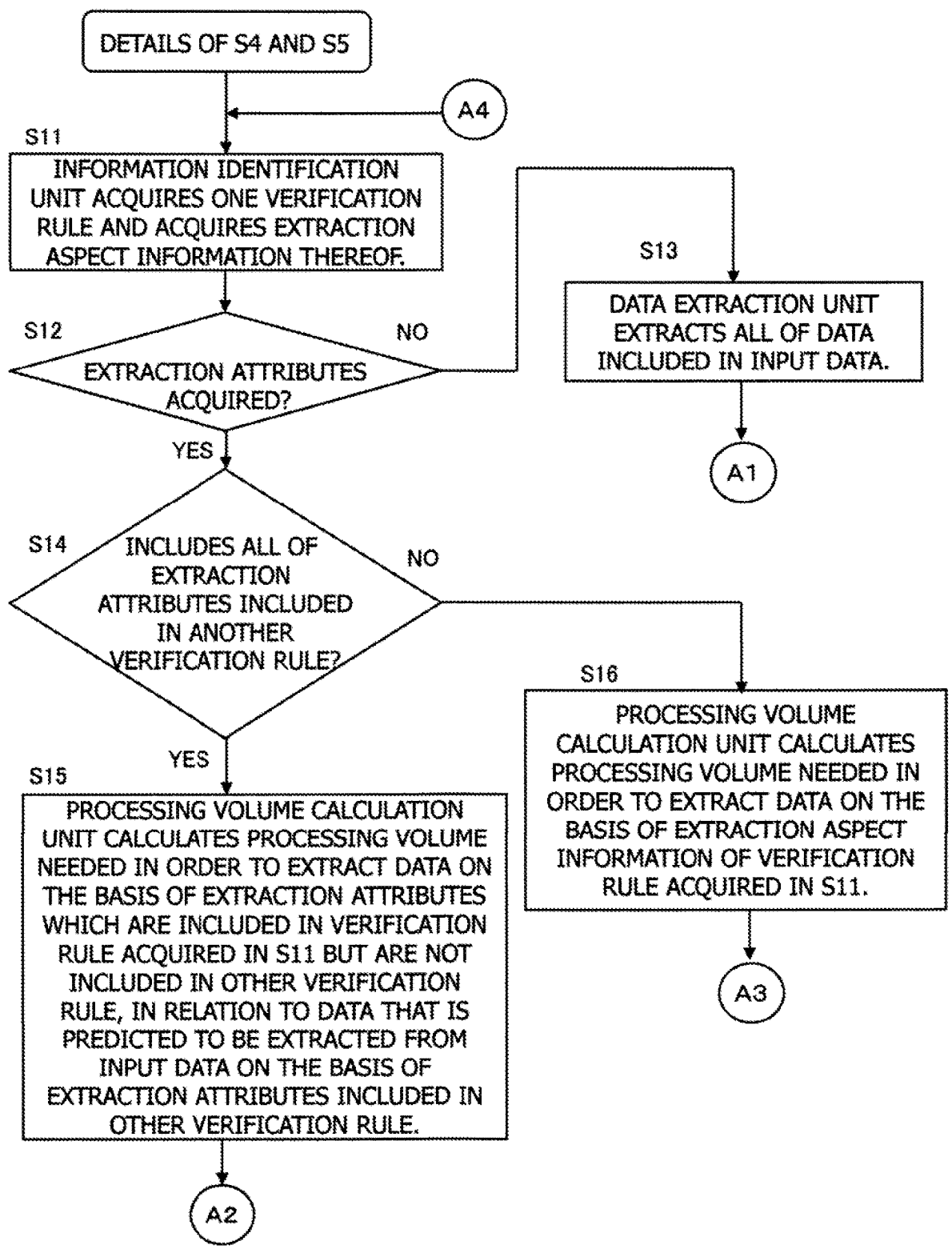
FIG. 19 depicts a flowchart illustrating the details of the extraction process according to the first embodiment.
Figure 20:
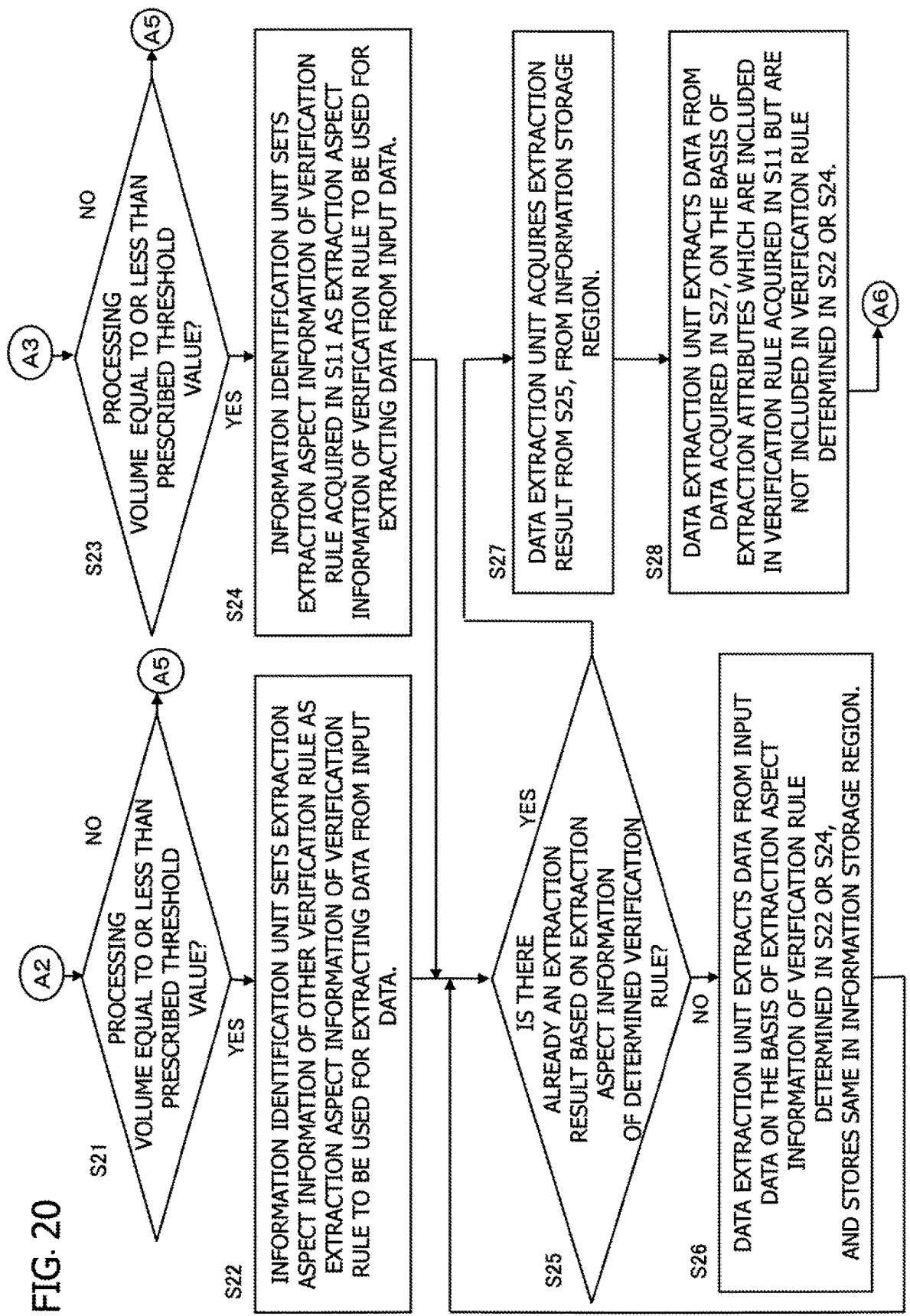
FIG. 20 depicts a flowchart illustrating the details of the extraction process according to the first embodiment.

Next, the details of the first embodiment will be described. FIG. 19 to FIG. 21 depict a flowchart illustrating the details of the extraction process (S4 and S5) according to the first embodiment. Furthermore, FIG. 22A to FIG. 25 are diagrams illustrating the details of the extraction process according to the first embodiment. The details of the extraction process in FIG. 19 to FIG. 21 is described here with reference to FIG. 22A to FIG. 25. In the description given below, it is supposed that there are 10,000 data elements of input data. Furthermore, in the description, it is supposed that the verification rule information 131 including the extraction aspect information 141 depicted in FIGS. 6A to 6F, and the correspondence information 132 illustrated in FIG. 14, have been stored previously in the information storage region 130.

The information identification unit 113 of the information processing device 1 acquires one element of verification rule information 131 from the information storage region 130, and acquires information about the extraction attributes included in the extraction aspect information 141 of the acquired verification rule information 131 (S11). Thereupon, the information identification unit 113 determines whether or not the extraction attributes have been acquired successfully in the process in S11 (S12).

If the extraction attributes have been acquired successfully in the process in S11 (YES at S12), then the information identification unit 113 refers to the correspondence information 132 and determines whether or not there exists another element of verification rule information 131 which includes all of the extraction attributes in the verification rule information 131 acquired by the process in S11 (S14).

As a result of this, if it is determined that there exists another element of verification rule information 131 that includes all of the extraction attributes (YES at S14), then the processing volume calculation unit 115 of the information processing device 1 calculates the processing volume information 138 associated with the extraction of data (S15). In this case, the processing volume calculation unit 115, for example, identifies the number of data elements in the input data that are predicted to be extracted on the basis of the extraction attributes included in the other verification rule information 131. For example, the processing volume calculation unit 115 calculates, in respect of the identified data, the processing volume information 138 needed in order to extract data on the basis of the extraction attributes which are included in the verification rule information 131 acquired by the process in S11 but are not included in the other verification rule information 131.

In other words, when all of the extraction attributes included in the other element of verification rule information 131 are also included in the verification rule information 131 acquired by the process in S11, there are cases where extraction of data from the input data has already been carried out on the basis of the extraction aspect information 141 of the other verification rule information 131. The processing volume associated with the extraction of data may then be smaller if the data extraction unit 114 of the information processing device 1 extracts data by reusing the results of data extraction based on the other verification rule information 131, rather than extracting data by referring to the correspondence information 132 illustrated in FIG. 11, etc. Consequently, in the process in S15, the processing volume calculation unit 115 calculates the processing volume information 138 for a case where data is extracted by reusing the data extraction results based on the other verification rule information 131. Thereby, as described below, the information identification unit 113 is able to determine whether or not to extract data by referring to the correspondence information 132 illustrated in FIG. 11, etc. (whether or not to extract data by reusing the data extraction results based on the extraction aspect information 141 of the other verification rule information 131).

More specifically, the processing volume calculation unit 115, for example, in the process in S15, identifies the number of data elements that are predicted to be extracted from the input data on the basis of the extraction attributes included in the other verification rule information 131. Furthermore, the processing volume calculation unit 115 identifies the number of data elements that are predicted to be extracted on the basis of the extraction attribute yielding the smallest ratio of extracted data, from among the extraction attributes which are included in the verification rule information 131 acquired by the process in S11 but are not included in the other verification rule information 131.

The processing volume calculation unit 115 then multiplies the smaller of the identified number of data elements by a value obtained by subtracting one from the number of extraction attributes which are included in the verification rule information 131 acquired by the process in S11 but are not included in the other verification rule information 131. The processing volume calculation unit 115 then calculates processing volume information 138 by adding the value obtained by this multiplication to the number of data elements extracted by the extraction attributes included the other verification rule information 131.

In other words, the processing volume calculation unit 115 identifies the number of data elements that are predicted to be extracted from the input data on the basis of the extraction attributes included in the verification rule information 131. The processing volume calculation unit 115 then calculates, in respect of each identified data element, an upper limit for the number of times it is determined whether or not that data is extracted on the basis of each of the extraction attributes which are included in the verification rule information 131 acquired by the process in S11 but are not included in the other verification rule information 131. A specific example of the process in S15 is described below.

In the process in S14, when there are a plurality of other elements of verification rule information 131, the information identification unit 113 may select the other verification rule information 131 which is predicted to yield the smallest number of data elements to be extracted.

Thereupon, as illustrated in FIG. 20, the information identification unit 113 determines whether or not the processing volume information 138 calculated by the process in S15 is equal to or less than a prescribed threshold value (S21). The prescribed threshold value is, for example, the number of input data. Furthermore, the prescribed threshold value may also be a value calculated by multiplying the number of input data by a prescribed coefficient.

If it is determined that the processing volume information 138 calculated by the process in S15 is equal to or less than the prescribed threshold value (YES at S21), then the information identification unit 113 sets the extraction aspect information 141 of the other verification rule information 131 that was determined to exist in the process in S14, as the extraction aspect information 141 of the verification rule information 131 to be used to extract data from the input data (S22). In other words, in this case, the information identification unit 113 decides to extract data by reusing the data extraction result based on the extraction aspect information 141 of the other verification rule information 131.

On the other hand, if it is determined in the process in S14 that there is no other verification rule information 131 which includes all of the extraction attributes (NO at S14), then the processing volume calculation unit 115 calculates the processing volume information 138 needed in order to extract data by the extraction aspect information 141 of the verification rule information 131 acquired by the process in S11 (S16).

In other words, even if the verification rule information 131 acquired by the process in S11 does not include all of the extraction attributes included in the other verification rule information 131, it may be advantageous to extract data without referring to the correspondence information 132 depicted in FIG. 11, etc. More specifically, this corresponds to a case where the processing volume associated with extraction of data can be restricted by extracting data in sequence on the basis of the extraction attributes included in the verification rule information 131 extracted by the process in S11, rather than extracting data by referring to the correspondence information 132 illustrated in FIG. 11, etc. Therefore, the processing volume calculation unit 115, in the process in S16, calculates the processing volume in a case where data is extracted in sequence based on the respective extraction attributes included in the verification rule information 131 extracted by the process in S11. Consequently, as described below, the information identification unit 113 is able to determine whether or not to extract data by referring to the correspondence information 132 illustrated in FIG. 11, etc. (whether or not to extract data in sequence based on the extraction attributes included in the verification rule information 131 extracted by the process in S11).

As illustrated in FIG. 20, the information identification unit 113 determines whether or not the processing volume information 138 calculated by the process in S16 is equal to or less than the prescribed threshold value (S23). As a result of this, when it is determined that the processing volume information 138 calculated by the process in S16 is equal to or less than the prescribed threshold value (YES at S23), then the information identification unit 113 sets the extraction aspect information 141 of the verification rule information 131 acquired by the process in S11, as the extraction aspect information 141 of the verification rule information 131 to be used for extracting data from the input data (S24). In other words, the information identification unit 113, in this case, decides to extract data in sequence on the basis of the extraction attributes included in the verification rule information 131 extracted by the process in S11.

Thereupon, after the process in S22 or the process in S24, the data extraction unit 114 determines whether or not there is data (extraction result) which has already been extracted on the basis of the extraction aspect information 141 of the verification rule information 131 determined by the process in S22 or the process in S24 (S25). As a result of this, when it is determined that there is no data that has already been extracted (NO at S25), the data extraction unit 114 extracts data from the input data on the basis of the extraction aspect information 141 of the verification rule information 131 determined by the process in S22 or the process in S24, and stores the data in the information storage region 130 (S26). Subsequently, the data extraction unit 114 carries out the process from S25 on, again.

In other words, if there is an inclusive relationship of the extraction aspect information 141 in the verification rule information 131, then the data extraction unit 114 extracts data on the basis of the included extraction aspect information 141, whichever of the elements of verification rule information 131 is evaluated first. Therefore, it is possible to raise the probability that the data extraction unit 114, when extracting data based on the extraction aspect information 141 of the verification rule information 131, will be able to reuse a data extraction result based on extraction aspect information 141 of another verification rule information 131.

On the other hand, when it is determined that there is data that has already been extracted (YES at S25), the data extraction unit 114 acquires the existing data (extraction result) in the process in S25, from the information storage region 130 (S27). Thereupon, the data extraction unit 114 extracts data from the data acquired by the process in S27, on the basis of extraction attributes which are included in the verification rule information 131 acquired by the process in S11 but are not included in the verification rule information 131 determined by the process in S22 or the process in S24 (S28).

In other words, when the process in S22 has been executed, the data extraction unit 114, in the process in S28, extracts data on the basis of extraction attributes which are included in the verification rule information 131 acquired by the process in S11 and which are not included in the verification rule information 131 determined by the process in S22. Consequently, the data extraction unit 114, in the process in S22, is able to extract data on the basis of all of the extraction attributes included in the verification rule information 131 acquired by the process in S11, even if the extraction aspect information 141 of the other verification rule information 131 has been set as the extraction aspect information 141 of the verification rule information 131 to be used for extracting data from the input data.

When the extraction result from the extraction aspect information 141 of the other verification rule information 131 has been reused, the data extraction unit 114 may create reuse information 136 which associates the other verification rule information 131 with the verification rule information 131 used to extract data by reusing the extraction results of the extraction aspect information 141 of the other verification rule information 131. More specifically, the data extraction unit 114, in this case, creates reuse information 136 which associates information indicating the verification rule information 131 acquired by the process in S11, with information indicating the verification rule information 131 determined by the process in S22. The data extraction unit 114 then stores the created reuse information 136 in the information storage region 130, for example. Therefore, the information processing device 1 is able to manage the verification rule information 131 which has reused extraction results.

Thereupon, the data extraction unit 114, as illustrated in FIG. 21, determines whether or not data has been extracted in respect of all of the verification rule information 131 stored in the information storage region 130 (S34). Thereupon, if it is determined that data has been extracted for in respect of all of the verification rule information 131 (YES at S34), then the data extraction unit 114 terminates the processes in S4 and S5. On the other hand, if it is determined that data has not been extracted in respect of all of the verification rule information 131 (NO at S34), then the data extraction unit 114 carries out the process from S11 on, again.

Furthermore, in the process in S21, if it is determined that the processing volume information 138 calculated by the process in S15 is not equal to or less than the prescribed threshold value (NO at S21), then the information identification unit 113 refers to the correspondence information 132, as illustrated in FIG. 21, and identifies, for each element of input data and each attribute, verification rule information 131 that includes extraction attributes matching the respective attributes of each data element (verification rule information 131 which includes extraction attributes satisfying the attributes of each data element) (S31). Subsequently, the information identification unit 113 identifies, for each element of input data, common verification rule information 134 which is common among the elements of verification rule information 131 identified by the process in S31 (S32).

The data extraction unit 114 then extracts data for which the verification rule information 131 acquired by the process in S11 has been identified as common verification rule information 134, from the input data (S33). Thereupon, the data extraction unit 114 carries out the process from S34 on. The information identification unit 113 carries out the process from S31 on, similarly to cases where it is determined that the processing volume information 138 calculated by the process in S16 is not equal to or less than the prescribed threshold value (NO at S21).

In other words, the information identification unit 113, in the process in S21 or S23, extracts the data by referring to the correspondence information 132 illustrated in FIG. 11, etc., if the processing volume in a case where data is extracted without referring to the correspondence information 132 illustrated in FIG. 11, etc. would exceed the prescribed threshold value. Consequently, the data extraction unit 114 is able to restrict the processing load associated with data extraction, in accordance with the processing volume associated with extraction of data from the input data on the basis of the respective verification rules 131a.

Furthermore, in the process in S12, if the extraction attributes have not been acquired successfully in the process in S11 (NO at S12), then the data extraction unit 114 extracts all of the data included in the input data (S13). More specifically, cases where the extraction attributes are not acquired successfully in the process in S11 are cases where the verification rule information 131 acquired by the process in S11 does not include any extraction attributes. Therefore, in this case, the data extraction unit 114 extracts all of the data included in the input data. The data extraction unit 114 then carries out the process from S34 on.

The information identification unit 113 may store the verification rule information 131 which branches from the process in S21 or the process in S23, to the process in S31, in a verification rule list (not illustrated). In the process in S34, the information identification unit 113 may, after determining that all of the verification rule information 131 has been extracted, carry out a process equivalent to the processes from S31 to S33, jointly, on the verification rule information 131 included in the verification rule list. Furthermore, the processes in S31 and S32 are both carried out for each element of input data, and therefore the information identification unit 113 may determine common verification rule information 134 for each element of input data, by sequentially executing the processes in S31 and S32, and then set all of the verification rules in the verification rule list included in common verification rule information 134, as verification object rules for the input data. Thereby, the information identification unit 113 can simply cycle through the input data in the execution of the process in S31 and is therefore able to reduce the number of executions of the process for extracting the attributes of each element of input data.

[Specific Example (1) of Processes in S4 and S5]

Next, a specific example of the processes in S4 and S5 will be described. Firstly, a case is described where, in the process in S11, the verification rule information 131d including the extraction aspect information 141d depicted in FIG. 6B is acquired.

More specifically, in the verification rule information 131d, there is no other verification rule information 131 which includes all of the extraction attributes (NO at S14). Therefore, the information identification unit 113 carries out the process from S16 on.

Here, the extraction aspect information 141d depicted in FIG. 6D only includes extraction attributes in which the "type" is "product category" and the "value" is "hardware". The data extraction unit 114, in this case, extracts data from the input data (10,000 data elements), only on the basis of an extraction attribute in which the "type" is "product category" and the "value" is "hardware". Therefore, the data extraction unit 114 calculates "10,000 (data elements)" as the processing volume information 138 in the process in S16.

If the prescribed threshold value is "13,000 (data elements)", for example, then the processing volume information 138, which is "10,000 (data elements)" is smaller than the prescribed threshold value (YES at S23). Therefore, the processing volume calculation unit 115 sets the extraction aspect information 141d of the verification rule information 131d as the extraction aspect information 141 of the verification rule information 131 to be used for extracting data from the input data (S24). Subsequently, the data extraction unit 114 extracts data from the input data on the basis of the extraction aspect information 141d of the verification rule information 131d, and stores the data in the information storage region 130 (NO at S25, S26).

When the verification rule information 131d has been acquired by the process in S11, the information identification unit 113 does not execute the process in S22. Therefore, the data extraction unit 114 does not extract further data in the process in S28.

Next, a case is described in which verification rule information 131c including the extraction aspect information 141c depicted in FIG. 6C has been extracted in the process in S11. In this case, there is no other verification rule information 131 that includes all of the extraction attributes, in the verification rule information 131c (NO at S14). Therefore, the information identification unit 113 carries out the process from S16 on.

Here, in the information depicted in FIG. 8, the "number of data elements" of information of which the "type" is "item name" and the "value" is "sales", among the information which has the extraction attributes included in the extraction aspect information 141c, is set to "6000 (data elements)". Furthermore, in the information depicted in FIG. 8, the "number of data elements" of information of which the "type" is "product category" and the "value" is "software", among the information which has the extraction attributes included in the extraction aspect information 141c, is set to "2000 (data elements)". Therefore, of the extraction attributes included in the extraction aspect information 141c, the extraction attribute corresponding to the information in which the "type" is "product category" and the "value" is "software" is a high-efficiency extraction attribute compared to the extraction attribute corresponding to the information in which the "type" is "item name" and the "value" is "sales". Consequently, the processing volume calculation unit 115 is able to restrict the processing volume information 138 that is needed when extracting data on the basis of the extraction aspect information 141c, by firstly extracting data on the basis of the extraction attribute in which the "type" is "product category" and the "value" is "software".

More specifically, the data extraction unit 114 extracts data from all of the input data (10,000 data elements) on the basis of an extraction attribute in which the "type" is "product category" and the "value" is "software". In this case, the data extraction unit 114 predicts that 2000 data elements will be extracted from the input data. Moreover, the data extraction unit 114 extracts data on the basis of an extraction attribute in which the "type" is "item name" and the "value" is "sales", from the data (2000 data elements) extracted by the extraction attribute in which the "type" is "product category" and the "value" is "software".

Therefore, the processing volume calculation unit 115, in this case, calculates "12,000 (data elements)", which is the sum of "10,000 (data elements)" and "2000 (data elements)", as the processing volume information 138 (S16).

If the prescribed threshold value is "13,000 (data elements)", for example, then the processing volume information 138 of "12,000 (data elements)" is smaller than the prescribed threshold value (YES at S23). Therefore, the processing volume calculation unit 115 sets the verification rule information 131c as the verification rule information 131 to be used for extracting data from the input data (S24). Subsequently, the data extraction unit 114 extracts data from the input data on the basis of the verification rule information 131c, and stores the data in the information storage region 130 (NO at S25, S26).

When the verification rule information 131c has been acquired by the process in S11, the information identification unit 113 does not execute the process in S22. Therefore, the data extraction unit 114 does not extract further data in the process in S28.

Next, a case is described in which the verification rule information 131b including the extraction aspect information 141b depicted in FIG. 6B has been acquired by the process in S11.

The extraction aspect information 141b depicted in FIG. 6B includes an extraction attribute in which the "type" is "item name" and the "value" is "sales", and an extraction attribute in which the "type" is "product category" and the "value" is "hardware". Furthermore, the extraction aspect information 141b depicted in FIG. 6B also includes extraction attributes in which the "type" is "location category" and the "value" is "America". In other words, the verification rule information 131 depicted in FIG. 6B includes all of the extraction attributes included in the extraction aspect information 141 depicted in FIG. 6D (a verification rule in which the "type" is "product category" and the "value" is "hardware") (YES at S14). Therefore, the processing volume calculation unit 115 carries out the process from S15 on.

More specifically, in the information illustrated in FIG. 8, the "number of data elements" of the information in which the "type" is "product category" and the "value" is "hardware" is set to "7500 (data elements)". Therefore, the processing volume calculation unit 115, in the process in S15, identifies "7500 (data elements)" as the number of data elements that are predicted to be extracted from the input data on the basis of the extraction attributes included in the other verification rule information 131.

Furthermore, in the information illustrated in FIG. 8, the "number of data elements" of the information in which the "type" is "item name" and the "value" is "sales" is set to "6000 (data elements)". Moreover, in the information illustrated in FIG. 8, the "number of data elements" of the information in which the "type" is "product category" and the "value" is "America" is set to "2000 (data elements)". Therefore, the processing volume calculation unit 115, in this case, identifies "2000 (data elements)" as the number of data elements extracted on the basis of the extraction attribute yielding the smallest ratio of extracted data, among the extraction attributes which are included in the verification rule information 131 acquired by the process in S11 but are not included in the other verification rule information 131. Consequently, the processing volume calculation unit 115 identifies "2000 (data elements)" as the smallest number of data elements, among the identified numbers of data elements.

Furthermore, whereas the number of extraction attributes included in the extraction aspect information 141b illustrated in FIG. 6B is "3", the number of extraction attributes included in the extraction aspect information 141d in FIG. 6D is "1". Therefore, the processing volume calculation unit 115 identifies "1" as the number obtained by subtracting one from the number of extraction attributes which are included in the extraction aspect information 141b but are not included in the extraction aspect information 141d. Consequently, the processing volume calculation unit 115 calculates "2000 (data elements)" as the number of data elements obtained by multiplying "2000 (data elements)" by "1".

The processing volume calculation unit 115 then calculates the processing volume information 138 to be "9500 (data elements)", which is the sum of the "2000 (data elements)" just calculated, plus the "7500 (data elements)" identified as the number of data elements extracted on the basis of the extraction attributes included in the verification rule information 131d. Here, for example, if the prescribed threshold value is "8000 (data elements)", then the processing volume information 138, "9500 (data elements)", is greater than the prescribed threshold value (NO at S21). Therefore, the process from S31 on is carried out.

More specifically, the information identification unit 113, as illustrated in FIGS. 22A to 22C and FIGS. 23A to 23C, creates identification candidate information 133 in which information corresponding to the verification rule information 131b is set (the state during creation of the identification candidate information 133 illustrated in FIGS. 15A to 15C and FIGS. 16A to 16C) (S31). The information identification unit 113, as illustrated in FIG. 24, then creates common verification rule information 134 in which the information corresponding to the verification rule information 131b is set (the state during creation of the common verification rule information 134 illustrated in FIG. 17) (S32). Moreover, as illustrated in FIG. 25, the data extraction unit 114 creates extraction result information 135 in which information corresponding to the verification rule information 131b is set (the state during creation of the extraction result information 135 illustrated in FIG. 18) (S33).

On the other hand, if the verification rule information 131b is acquired in the process in S11, and if, for example, the prescribed threshold value is "13,000 (data elements)", which is greater than the processing volume information 138, which is "9500 (data elements)" (YES at S21), then the information identification unit 113 carries out the process from S22 on. In other words, the information identification unit 113, in this case, sets the verification rule information 131d which is the other verification rule information 131, as the verification rule information 131 to be used in extracting data from the input data (S22).

In this case, since there is already an extraction result based on the verification rule information 131d (Yes at S25), then the data extraction unit 114 carries out the process from S27 on. In other words, the information identification unit 113 extracts data, from the data extracted by the verification rule information 131d, on the basis of the extraction attributes which are included in the verification rule information 131b but are not included in the verification rule information 131d (S28).

More specifically, the extraction attributes which are included in the verification rule information 131b but are not included in the verification rule information 131d are the extraction attribute in which the "type" is "item name" and the "value" is "sales", and the extraction attribute in which the "type" is "location category" and the "value" is "America". In the information depicted in FIG. 8, the "number of data elements" of the information in which the "type" is "item name" and the "value" is "sales" is set to "6000 (data elements)". Furthermore, in the information depicted in FIG. 8, the "number of data elements" of the information in which the "type" is "location category" and the "value" is "America" is set to "2000 (data elements)". Therefore, the data extraction unit 114 extracts data from the data extracted on the basis of the verification rule information 131d, by preferentially using, for example, the extraction attribute in which the "type" is "location category" and the "value" is "America", rather than the extraction attribute in which the "type" is "item name" and the "value" is "sales".

In this way, the information processing device 1 according to the present embodiment creates correspondence information 132 which associates the extraction attributes that match the respective attributes of each data element included in the input data, with verification rule information 131 including each extraction attribute. When extracting data from the input data, the information processing device 1 then refers to the correspondence information 132 and, for each element of input data and each attribute, determines whether or not the data attributes match the extraction attributes. Moreover, the information processing device 1 identifies, for each element of input data, the common verification rule information 134 which includes each of the extraction attributes determined to match the attributes of each data element. Thereupon, the information processing device 1 extracts, for each element of verification rule information 131, the data for which the verification rule information 131 is identified as common verification rule information 134.

Consequently, the information processing device 1 is able to extract data from the input data efficiently, even when there is verification rule information 131 which does not include a high-efficiency extraction attribute.

When the verification rule information 131 includes prerequisite information 137, and the prerequisite information 137 is not dependent on the data extraction result, then it is possible to determine whether or not to use that verification rule information 131 for the extraction of data, in advance, before the data extraction process. The prerequisite information 137 is a conditional formula used to determine whether or not to actually apply the verification rule information 131 to the extracted data. If the prerequisite information 137 is not dependent on the extracted data, then this means that the variable where the extraction result is accommodated in the conditional formula of the prerequisite information 137 is not referred to. Therefore, by excluding verification rule information 131 which is not to be applied after data extraction, before the data extraction process takes place, the information processing device 1 is able to carry out the processes in S4 and S5 more efficiently.

Details of Second Embodiment

Figure 26:
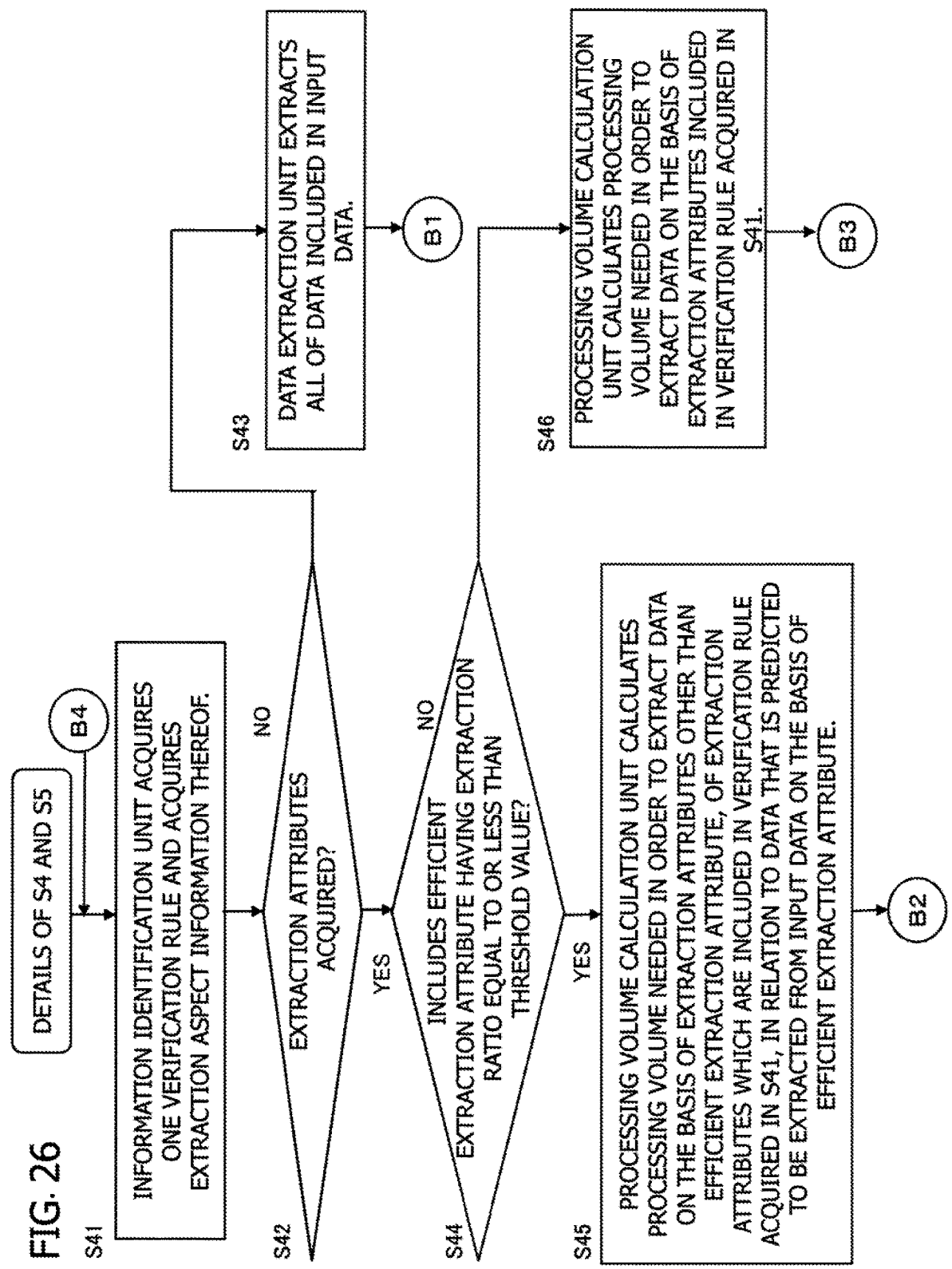
FIG. 26 is a flowchart illustrating details of an extraction process according to the second embodiment.
Figure 27:
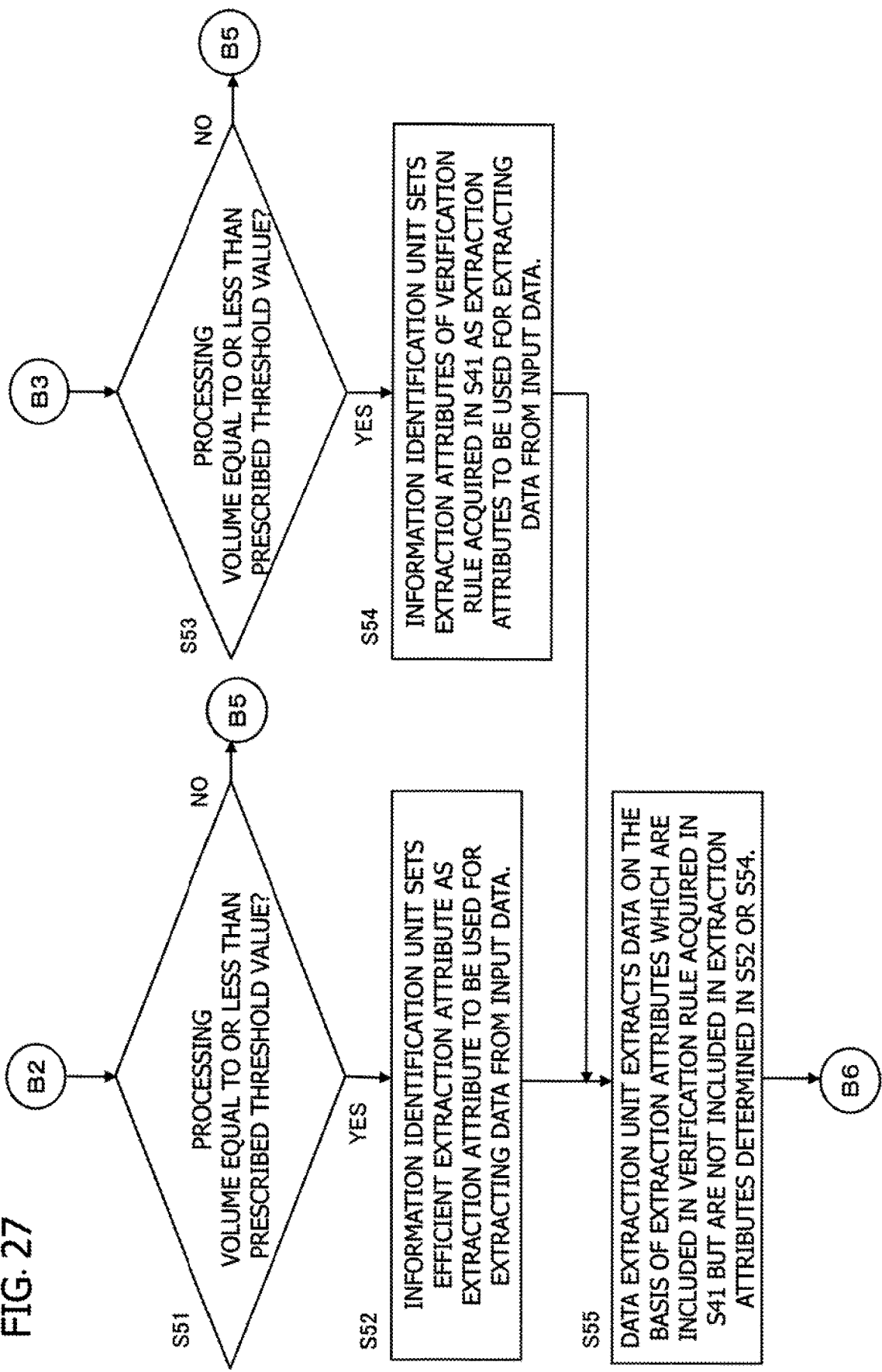
FIG. 27 is a flowchart illustrating details of an extraction process according to the second embodiment.
Figure 28:
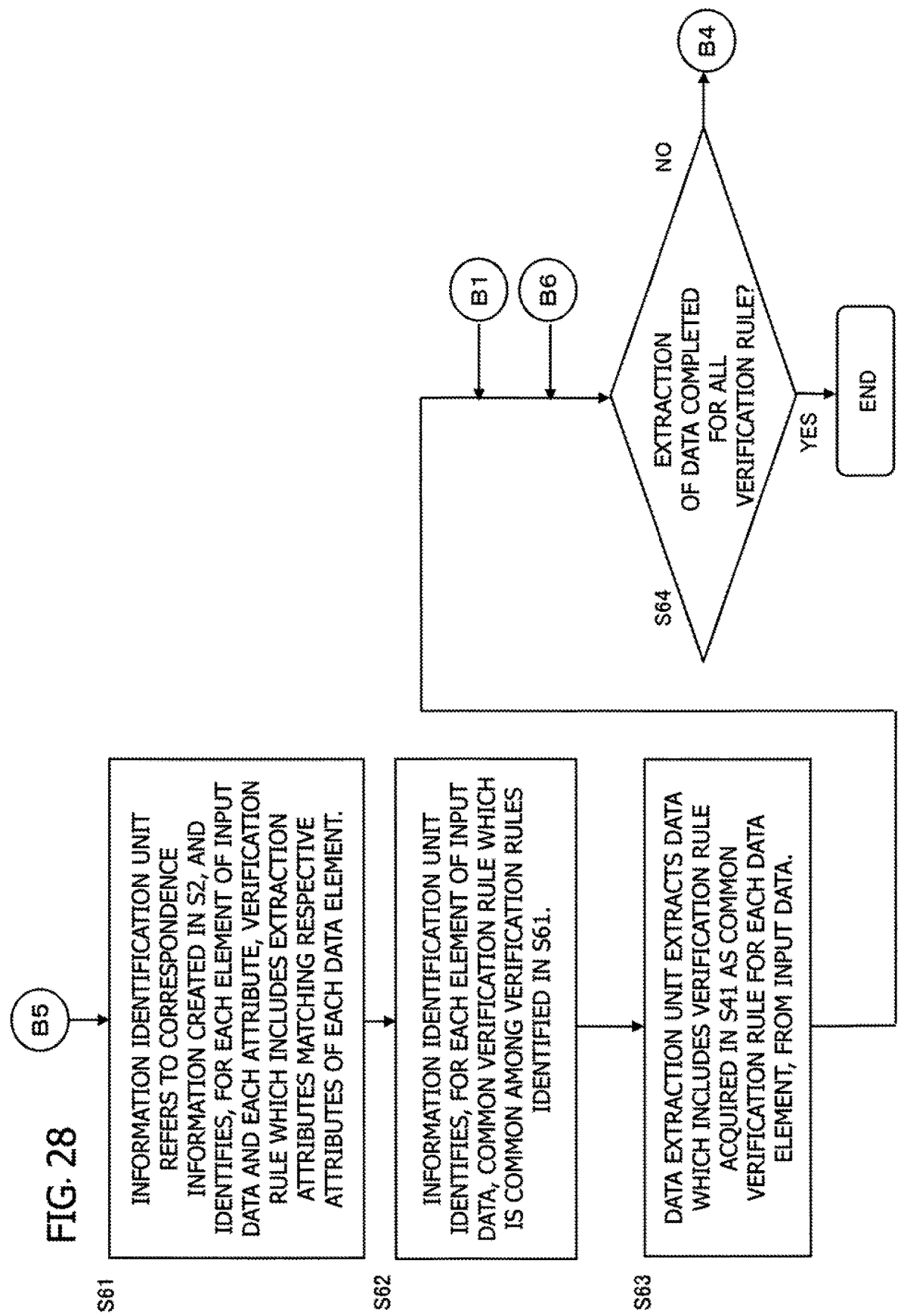
FIG. 28 is a flowchart illustrating details of an extraction process according to the second embodiment.

Next, the details of a second embodiment will be described. FIG. 26 to FIG. 28 are a flowchart illustrating details of an extraction process according to the second embodiment.

In the extraction process according to the first embodiment, if there is verification rule information 131 which includes all of the extraction attributes in other verification rule information 131, then the information processing device 1 determines whether or not to extract data by reusing the extraction results based on the other verification rule information 131, rather than extracting data by referring to the correspondence information 132. On the other hand, in the extraction process according to the second embodiment, if the verification rule information 131 includes a high-efficiency extraction attribute (also called "efficient extraction attribute" below), then the information processing device 1 determines whether or not to extract data by giving preference to extraction based on the efficient extraction attribute, rather than extracting data by referring to the correspondence information 132.

Consequently, the data extraction unit 114 is able to extract data efficiently on the basis of extraction attributes included in the verification rule information 131 including the efficient extraction attribute. The details of the second embodiment are described below.

The information identification unit 113 acquires one element of verification rule information 131 from the information storage region 130, and acquires information about the extraction attributes included in the verification rule information 131 (S41). Thereupon, the information identification unit 113 determines whether or not the extraction attributes have been acquired successfully by the process in S41 (S42).

If the extraction attributes have been acquired successfully by the process in S41 (YES at S42), then the information identification unit 113 refers to the correspondence information 132 and determines whether or not the extraction attributes include an efficient extraction attribute, which is an extraction attribute that is included in the verification rule information 131 acquired by the process in S41 and that yields a ratio of extracted information equal to or less than a prescribed threshold value (S44).

As a result of this, if it is determined that the extraction attributes include an efficient extraction attribute having a ratio of extracted information equal to or less than the prescribed threshold value (YES at S44), then the processing volume calculation unit 115 calculates the processing volume information 138 associated with the extraction of data (S45). In this case, the processing volume calculation unit 115 determines the number of data elements predicted to be extracted from the input data on the basis of the efficient extraction attribute. The processing volume calculation unit 115 then calculates the processing volume information 138 needed in order to extract data in respect of the identified number of data elements, on the basis of extraction attributes other than the efficient extraction attribute among the extraction attributes included in the verification rule information 131 acquired by the process in S41.

In other words, if the verification rule information 131 acquired by the process in S41 includes an efficient extraction attribute, then the processing volume associated with extracting data may be smaller if the data is extracted in sequence on the basis of the extraction attributes included in the verification rule information 131, rather than extracting data by referring to the correspondence information 132. Therefore, in the process in S45, the processing volume calculation unit 115 calculates the processing volume information 138 for a case where data is extracted in sequence based on the extraction attributes included in the verification rule information 131 acquired by the process in S41. Thereby, the information identification unit 113, as described hereinafter, is able to determine whether or not to extract data by referring to the correspondence information 132 (whether or not to extract data in sequence on the basis of the extraction attributes included in the verification rule information 131).

More specifically, in the process in S45, the processing volume calculation unit 115 identifies the number of data elements that are predicted to be extracted from the input data on the basis of the efficient extraction attribute. The processing volume calculation unit 115 then identifies the number of data elements that are predicted to be extracted on the basis of the extraction attribute yielding the smallest ratio of extracted data, among the extraction attributes other than the efficient extraction attribute which are included in the verification rule information 131 acquired by the process in S41.

Thereupon, the processing volume calculation unit 115 multiplies the smallest number of data elements, among the identified numbers of data elements, by a value obtained by subtracting one from the number of extraction attributes other than the efficient extraction attribute among the extraction attributes included in the verification rule information 131 acquired by the process in S41. Moreover, the processing volume calculation unit 115 calculates the processing volume information 138 by adding the number of data elements that are extracted on the basis of the efficient extraction attribute to the value obtained by this multiplication.

In other words, the processing volume calculation unit 115 calculates an upper limit for the number of times to determine whether or not the data elements extracted from the input data on the basis of the efficient extraction attribute are data elements that are extracted on the basis of the respective extraction attributes other than the efficient extraction attribute, in the extraction attributes included in the verification rule information 131 acquired by the process in S41.

Subsequently, as illustrated in FIG. 27, the information identification unit 113 determines whether or not the processing volume information 138 calculated by the process in S45 is equal to or less than the prescribed threshold value (S51).

If it is determined that the processing volume information 138 calculated by the process in S45 is equal to or less than the prescribed threshold value (YES at S51), then the information identification unit 113 sets the efficient extraction attribute determined to be present in the process in S44, as the extraction attribute to be used for extracting data from the input data (the extraction attribute to be used for extracting data first) (S52). In other words, the information identification unit 113, in this case, decides to extract data by the extraction attributes included in the verification rule information 131 (including the efficient extraction attribute), in sequence from the attribute yielding the smallest ratio of extracted data.

On the other hand, if it is determined in the process in S44 that there is no efficient extraction attribute (NO at S44), then the processing volume calculation unit 115 calculates the processing volume information 138 needed in order to extract data by the extraction attributes acquired by the process in S41 (S46).

In other words, if the verification rule information 131 acquired by the process in S41 does not include an efficient extraction attribute, then it may be more advantageous to extract data without referring to the correspondence information 132 illustrated in FIG. 11, etc. More specifically, this corresponds to a case where the processing volume associated with the extraction of data can be restricted further by extracting data on the basis of the extraction attributes included in the verification rule information 131 extracted by the process in S41, in sequence from the attribute yielding the smallest ratio of extracted data, rather than extracting data by referring to the correspondence information 132 illustrated in FIG. 11, etc. Therefore, in the process in S46, the processing volume calculation unit 115 calculates the processing volume information 138 for a case where data is extracted on the basis of each of the extraction attributes included in the verification rule information 131 extracted by the process in S41.

As illustrated in FIG. 27, the information identification unit 113 then determines whether or not the processing volume information 138 calculated by the process in S46 is equal to or less than the prescribed threshold value (S53). If, as a result of this, it is determined that the processing volume information 138 calculated by the process in S53 is equal to or less than the prescribed threshold value (YES at S53), then the information identification unit 113 sets the extraction aspect information 141 of the verification rule information 131 acquired by the process in S41, as the extraction aspect information 141 of the verification rule information 131 to be used for extracting data from the input data (S54). In other words, in this case, the information identification unit 113 decides to extract data on the basis of the extraction attributes included in the verification rule information 131 extracted by the process in S41.

Thereupon, after the process in S52 or the process in S54, the data extraction unit 114 extracts data on the basis of the extraction attributes which are included in the verification rule information 131 acquired by the process in S41 but are not included in the extraction attributes determined by the process in S52 or the process in S54 (S55).

Thereupon, as illustrated in FIG. 28, the data extraction unit 114 determines whether or not data has been extracted on the basis of all of the verification rule information 131 stored in the information storage region 130 (S64). If it is determined that data has been extracted on the basis of all of the verification rule information 131 (YES at S64), then the data extraction unit 114 terminates the processes in S4 and S5. On the other hand, if it is determined that data has not been extracted on the basis of all of the verification rule information 131 (NO at S64), then the data extraction unit 114 carries out the process from S41 on, again.

Furthermore, in the process in S51, if it is determined that the processing volume information 138 calculated by the process in S46 is not equal to or less than the prescribed threshold value (NO at S51), then as illustrated in FIG. 28, the information identification unit 113 refers to the correspondence information 132 and identifies, for each element of input data, the verification rule information 131 which includes extraction attributes matching the respective attributes of each data element (S61). Subsequently, the information identification unit 113 identifies, for each element of input data, common verification rule information 134 which is common among the verification rule information 131 identified by the process in S61 (S62). The data extraction unit 114 extracts data for which the verification rule information 131 acquired by the process in S41 has been identified as common verification rule information 134, from the input data (S63). Thereupon, the data extraction unit 114 carries out the process from S64 on. The information identification unit 113 carries out the process from S61 on, similarly to a case where it is determined that the processing volume information 138 calculated by the process in S46 is not equal to or less than a prescribed threshold value (NO at S51).

On the other hand, if the extraction attributes have not been acquired successfully in the process in S41 (NO at S42), then the data extraction unit 114 extracts all of the data included in the input data (S43). In other words, a case where the extraction attributes have not been acquired successfully by the process in S41 is a case where the verification rule information 131 acquired by the process in S41 does not include extraction attributes. Therefore, in this case, the data extraction unit 114 extracts all of the data included in the input data. The data extraction unit 114 then carries out the process from S64 on.

[Specific Example (2) of Processes in S4 and S5]

Next, a specific example of the processes in S4 and S5 will be described. Below, a case is described in which verification rule information 131c including the extraction aspect information 141c illustrated in FIG. 6C is acquired in the process in S41.

In the information illustrated in FIG. 8, the "number of data elements" of the information in which the "type" is "item name" and the "value" is "sales", of the information which has the extraction attributes included in the extraction aspect information 141c, is set to "6000 (data elements)". Furthermore, in the information illustrated in FIG. 8, the "number of data elements" of the information in which the "type" is "product category" and the "value" is "software", of the information which has the extraction attributes included in the extraction aspect information 141c, is set to "2000 (data elements)". Therefore, if the prescribed threshold in the process in S44 is "25(%)", then the extraction attribute in which the "type" is "product category" and the "value" is "software" is an efficient extraction attribute (YES at S44). Therefore, the processing volume calculation unit 115 carries out the process in S45.

More specifically, in the information depicted in FIG. 8, the "number of data elements" of the information in which the "type" is "product category" and the "value" is "software" is set to "2000 (data elements)". Therefore, the processing volume calculation unit 115, in the process in S45, identifies "2000 (data elements)" as the number of data elements that are predicted to be extracted from the input data by the efficient extraction attribute.

Furthermore, in the information illustrated in FIG. 8, the "number of data elements" of the information in which the "type" is "item name" and the "value" is "sales" is "6000 (data elements)". Therefore, in this case, the processing volume calculation unit 115 identifies "6000 (data elements)" as the number of data elements extracted on the basis of the extraction attribute yielding the smallest ratio of extracted data, among the extraction attributes other than the efficient extraction attribute which are included in the verification rule information 131 acquired by the process in S41. Consequently, the processing volume calculation unit 115 identifies "2000 (data elements)" which is the smaller number of data elements among the identified numbers of data elements.

Moreover, since the number of extraction attributes included in the extraction aspect information 141c depicted in FIG. 6C is "2", then the number obtained by subtracting one from the number of extraction attributes other than the efficient extraction attribute among the extraction attributes included in the extraction aspect information 141c is "0". Therefore, the processing volume calculation unit 115 calculates "0 (data elements)" as the number of data elements obtained by multiplying the "2000 (data elements)" by "0".

The processing volume calculation unit 115 calculates "2000 (data elements)", as the processing volume information 138, by adding the "2000 (data elements)" identified as the number of data elements extracted on the basis of the efficient extraction attribute, to "0 (data elements)" which is calculated by the multiplication above. Here, if the prescribed threshold value is "13,000 (data elements)", for example, then the "2000 (data elements)" calculated as the processing volume information 138 is smaller than the prescribed threshold value (YES at S51). Therefore, the process from S52 on is carried out.

More specifically, the information identification unit 113 sets the efficient extraction attribute (the extraction attribute in which the "type" is "product category" and the "value" is "software") as the extraction attribute to be used for extracting data from the input data (S52). Thereafter, the data extraction unit 114 extracts data from the data extracted by the efficient extraction attribute, on the basis of an extraction attribute which is included in the verification rule information 131c but is not included in the efficient extraction attribute (an extraction attribute in which the "type" is "item name" and the "value" is "sales") (S55).

Consequently, the information identification unit 113 is able to extract data while restricting the processing volume associated with the extraction of data, in accordance with whether or not the verification rule 131 includes an efficient extraction attribute.

[Details of Processes in S31 and S32]

Figure 29:
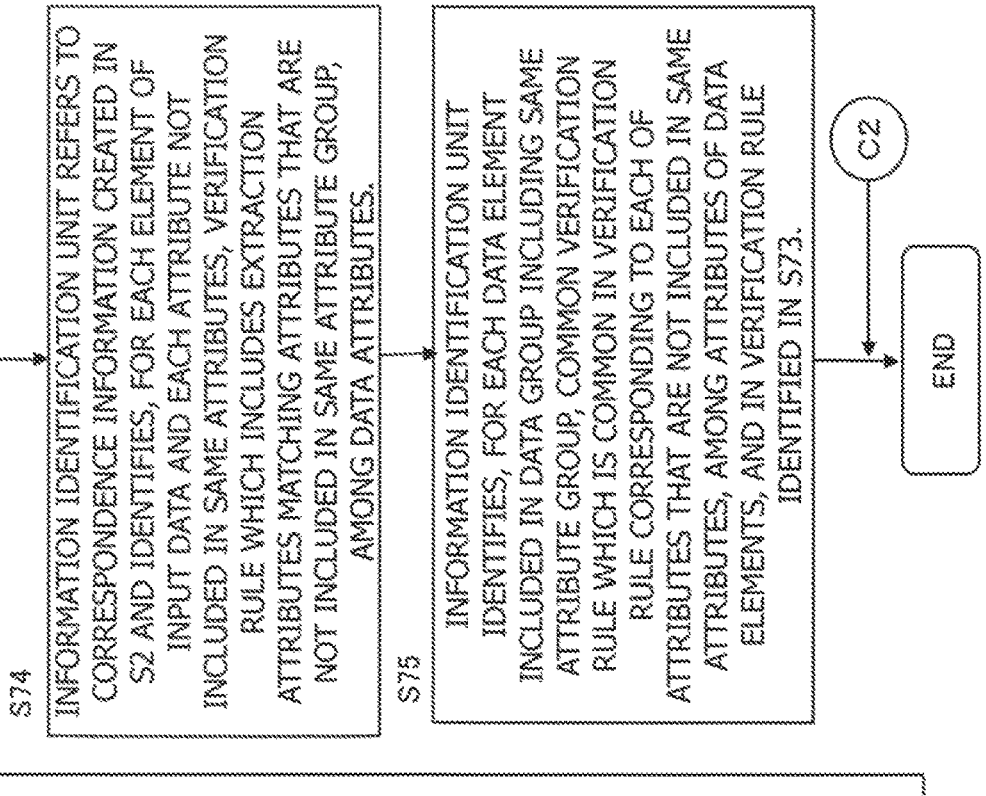
FIG. 29 is a flowchart illustrating the details of the processes in S31 and S32.
Figure 30:
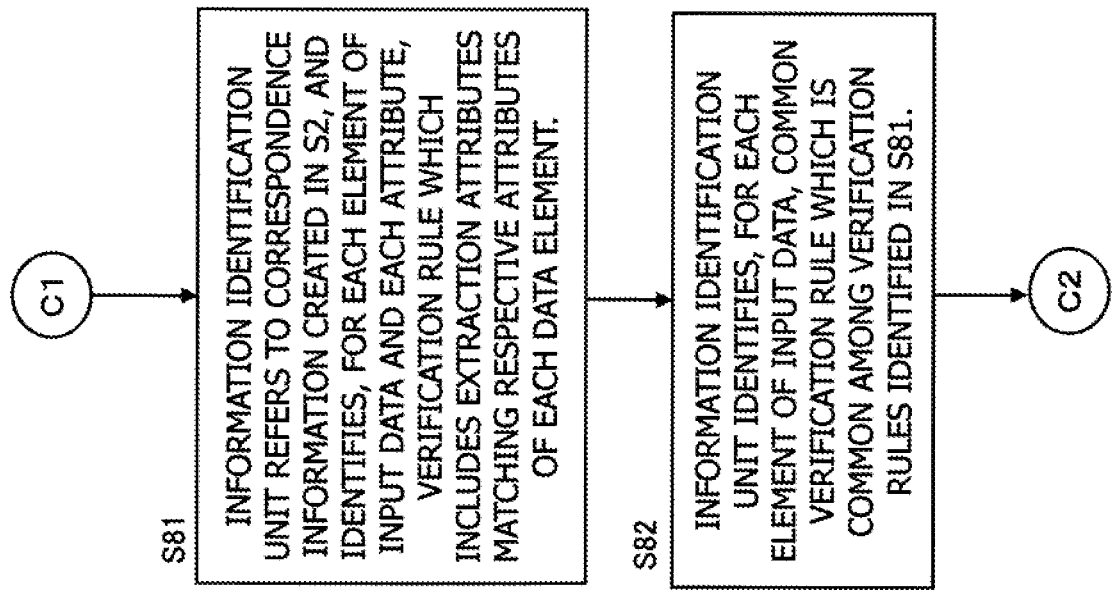
FIG. 30 is a flowchart illustrating the details of the processes in S31 and S32.

Next, the details of the processes in S31 and S32 (the processes in S61 and S62) will be described. FIG. 29 and FIG. 30 are flowcharts illustrating the details of the processes in S31 and S32. Below, a plurality of attributes are also simply called "attribute group".

The information identification unit 113, for example, determines whether or not the input data includes a plurality of data elements (also called "data group" below) which include the same attribute group (S71). If there is a data group including the same attribute group (YES at S71), then the information identification unit 113 refers to the correspondence information 132 and identifies, for each same attribute group, the verification rule information 131 which includes extraction attributes matching the respective attributes included in the same attribute group included in the data group present in the process in S71 (S72). Moreover, the information identification unit 113 identifies, for each same attribute group, the common verification rule information 134a which is common in the verification rule information 131 corresponding to each same attribute group included in the data group present in the process in S71 (S73).

The information identification unit 113 then creates data group information 139 and stores same in the information storage region 130, in the process in S73. A specific example of the data group information 139 is described below.

[Specific Example of Data Group Information]

FIG. 31 is a diagram illustrating a specific example of the data group information 139. The data group information 139 illustrated in FIG. 31 includes, as items, "item number" which identifies each information element included in the data group information 139, "input data" which identifies each data element included in the input data, and "type" which sets the type of each data element in the input data. Furthermore, the data group information 139 illustrated in FIG. 31 includes, as items, "value" which is set to the value of each data element included in the input data, and "common verification rule" which is set to the common verification rule information 134 set by the process in S73.

More specifically, for instance, in the aspect information depicted in FIG. 4A and the aspect information depicted in FIG. 5A, the aspect information in which the "type" is "product category" and the "value" is "hardware" (the elements of aspect information of which the "item number" is "2") is the same. Furthermore, for example, in the aspect information depicted in FIG. 4A and the aspect information depicted in FIG. 5A, the aspect information in which the "type" is "location category" and the "value" is "America" (the elements of aspect information of which the "item number" is "3") is the same. Therefore, the information identification unit 113, in the process in S71, sets the data corresponding to the aspect information illustrated in FIG. 4A and the data corresponding to the aspect information illustrated in FIG. 5A, as a data group.

In the process in S72, the information identification unit 113 then refers to the correspondence information 132 illustrated in FIG. 14, and identifies "131b", "131d", "131e", "131f" and "131g", which is information set as the "verification rule" of the information in which the "type" is "product category" and the "value" is "hardware". Furthermore, the information identification unit 113 identifies "131a", "131b", "131c", "131d" and "131g", which is information set as the "verification rule" of the information in which the "type" is "location category" and the "value" is "America". Moreover, the information identification unit 113 identifies "131b", "131d" and "131g" which is information common in the identified information, as the common verification rule information 134a in the process in S73.

Therefore, as illustrated in FIG. 31, the information identification unit 113 sets "data 1" and "data 4" as the "input data" in the information having an "item number" of "1", sets "product category" as the "type", and sets "hardware" as the "value" corresponding to the "product category". Furthermore, the information identification unit 113 sets "location category" as the "type", and sets "America" as the "value" corresponding to the "location category" in the information having an "item number" of "1". Moreover, the information identification unit 113 sets "131b", "131d" and "131g" as the "common verification rule" in the information having an "item number" of "1". The remainder of the information included in FIG. 31 is not described here.

More specifically, the information identification unit 113 identifies the common verification rule information 134a before identifying the common verification rule information 134 corresponding to the input data including the common attributes. Thereby, the information identification unit 113 does not need to carry out identification of the common verification rule information 134a, a plurality of times, when there are a plurality of data elements (data group) which include common attributes in the input data. Therefore, the information identification unit 113 is able to reduce the processing load associated with the extraction of data.

Returning to FIG. 29, the information identification unit 113 refers to the correspondence information 132 and identifies the verification rule information 131 which includes extraction attributes matching the attributes of the respective data elements that are not included in the same attribute group (S74). In this case, the information identification unit 113 identifies the verification rule information 131, for each element of input data and for each attribute that is not included in the same attribute group. The information identification unit 113 identifies, for each data element included in the data group corresponding to the same attribute group, the common verification rule information 134 which is common in the verification rule information 131 corresponding to the respective attributes that are not included in the same attribute group, among the attributes of each data element, and the common verification rule information 134a identified by the process in S73 (S75). In this case, the information identification unit 113 identifies the common verification rule information 134 for each data element included in the data group corresponding to the same attribute group.

More specifically, for example, the aspect information in which the "type" is "item name" (the elements of aspect information having an "item number" of "1") is not the same in the aspect information illustrated in FIG. 4A and the aspect information illustrated in FIG. 5A. Therefore, the information identification unit 113, in the process in S74, refers to the correspondence information 132 illustrated in FIG. 14 and identifies "131a", "131b", "131c", "131d", "131e", "131f" and "131g", which is information set as the "verification rule" of the information in which the "type" is "item name" and the "value" is "sales".

Thereupon, the information identification unit 113, in the process in S75, refers to the data group information 139 illustrated in FIG. 31, and acquires the common verification rule information 134a corresponding to the aspect information of the data 1 illustrated in FIG. 4A. The information identification unit 113 identifies the common verification rule information 134 which is common in the acquired common verification rule information 134a and the verification rule information 131 identified by the process in S74.

In other words, in this case, the information identification unit 113 identifies "131b", "131d" and "131g" as the common verification rule information 134.

On the other hand, if there is no data group including the same attribute group (NO at S71), the information identification unit 113, as illustrated in FIG. 30, refers to the correspondence information 132 and identifies, for each element of input data and for attribute, the verification rule information 131 which includes extraction attributes matching the respective attributes of each data element (S81). The information identification unit 113 identifies, for each element of input data, common verification rule information 134 which is common in the verification rule information 131 identified by the process in S81 (S82). In other words, in the process in S71, if there is no data group including the same attribute group, the information identification unit 113 carries out the same process as the process in S32 and S33 illustrated in FIG. 21, etc.

Consequently, the information identification unit 113 does not need to carry out identification of the common verification rule information 134a a plurality of times, if there is a data group including common attributes. Therefore, the information identification unit 113 can restrict the processing load associated with the extraction of data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein an extraction program that causes a computer to execute a process comprising:

referring to a storage that stores correspondence information associating extraction attributes which match respective attributes of each data element included in a plurality of data elements, from among extraction attributes included in verification rules, and verification rules which include the extraction attributes, and identifying, for each of the plurality of data elements and for each attribute, the verification rule including the extraction attributes matching each attribute;

identifying, for each of the plurality of data elements, a common verification rule which is common in the verification rules corresponding to the attributes of each data element; and extracting, for each verification rule, data for which the verification rule has been identified as the common verification rule from each data element included in the plurality of data elements.

2. The non-transitory computer-readable storage medium according to claim 1, wherein the extraction attributes include an extraction type indicating the type of the extraction attribute and an extraction value which is a value corresponding to the extraction type, and the identifying the common verification rule includes identifying the verification rule which includes the extraction attributes including the extraction type and the extraction value which match the type of the attribute of each data element and a value corresponding to the type.

3. The non-transitory computer-readable storage medium according to claim 1, wherein
the identifying the verification rule includes identifying the verification rule, when there are a plurality of verification rules which include the same extraction attributes, by regarding that only the information of one of the plurality of verification rules is included in the correspondence information, and
the extracting the data includes extracting the data by regarding that data for which the one of the verification rules has been identified as the common verification rule is data for which each of the plurality of verification rules has been identified as the common verification rule.

4. The non-transitory computer-readable storage medium according to claim 1, wherein the program further causes the computer to execute a process comprising:
when the correspondence information includes information of a specific verification rule which includes all of extraction attributes included in another verification rule, calculating, for each specific verification rule, a processing volume in order to extract data on the basis of extraction attributes which are included in the specific verification rule but are not included in the other verification rule, from data extracted from the plurality of data elements on the basis of extraction attributes included in the other verification rule; and
when there is the specific verification rule for which the calculated processing volume is equal to or less than a prescribed threshold value, extracting data on the basis of the extraction attributes which are included in the specific verification rule but are not included in the other verification rule, from the data extracted from the plurality of data elements on the basis of the extraction attributes included in the other verification rule.

5. The non-transitory computer-readable storage medium according to claim 4, wherein the processing volume is the number of times it is determined whether or not each of data elements extracted from the plurality of data elements on the basis of the extraction attributes included in the other verification rule is data element that is extracted on the basis of the extraction attributes which are included in the specific verification rule but are not included in the other verification rule.

6. The non-transitory computer-readable storage medium according to claim 5, wherein the processing volume is calculated by multiplying the fewer of the number of data elements extracted from the plurality of data elements on the basis of the extraction attributes included in the other verification rule, and the number of data elements extracted on the basis of an extraction attribute yielding a minimum ratio of the extracted data elements among the extraction attributes which are included in the specific verification rule but are not included in the other verification rule, by a value obtained by subtracting one from the number of extraction attributes which are included in the specific verification rule but are not included in the other verification rule, and adding, to the obtained value, the number of data elements extracted on the basis of the extraction attributes included in the other verification rule.

7. The non-transitory computer-readable storage medium according to claim 4, wherein the prescribed threshold value is the number of the plurality of data elements.

8. The non-transitory computer-readable storage medium according to claim 4, wherein the prescribed threshold value is a value obtained by multiplying the number of the plurality of data elements by a prescribed coefficient.

9. The non-transitory computer-readable storage medium according to claim 1, wherein the program further causes the computer to execute a process comprising:
when there is a prerequisite extraction attribute which is not dependent on a result of the extracting the data, extracting data from the plurality of data elements on the basis of the prerequisite extraction attribute prior to the identifying the verification rule, and
the identifying the verification rule includes identifying the verification rule on data that has been extracted from the plurality of data elements on the basis of the prerequisite extraction attribute, and
the identifying the common verification rule includes identifying the common verification rule on data that has been extracted from the plurality of data elements on the basis of the prerequisite extraction attribute.

10. The non-transitory computer-readable storage medium according to claim 1, wherein the program further causes the computer to execute a process comprising:
when the correspondence information includes information of a specific verification rule including an efficient extraction attribute for which the ratio of extracted data is equal to or less than a prescribed threshold value, calculating, for each specific verification rule, a processing volume that is in order to extract data on the basis of extraction attributes other than the efficient extraction attribute among the extraction attributes included in the specific verification rule, from data extracted from the plurality of data elements on the basis of the efficient extraction attribute; and
when there is the specific verification rule for which the calculated processing volume is equal to or less than a prescribed threshold value, extracting data on the basis of the extraction attributes other than the efficient extraction attribute among the extraction attributes included in the specific verification rule, from the data extracted from the plurality of data elements on the basis of the efficient extraction attributes.

11. The non-transitory computer-readable storage medium according to claim 1, wherein the program further causes the computer to execute a process comprising:
when there is a specific data group including the same attribute group in the plurality of data elements, identifying, for each same attribute group, the verification rule which includes the extraction attributes matching respective attributes included in the same attribute group, and identifying, for each same attribute group, a specific verification rule which is common in the verification rules corresponding to the attributes included in each same attribute group; and
identifying, for each data element included in the specific data group and for each of attributes that are not included in the same attribute group, the verification rule which includes the extraction attributes matching the respective attributes, and identifying as the common verification rule, for each data element included in the specific data group, a verification rule which is common in the specific verification rules and in the verification rules corresponding to the respective attributes that are not included in the same attribute group among the attributes of the data elements, and the identifying the verification rule includes identifying the verification rule on data other than the data included in the specific data group from among the plurality of data elements, and the identifying the common verification rule includes identifying the common verification rule on data other than the data included in the specific data group from among the plurality of data elements.

12. The non-transitory computer-readable storage medium according to claim 1, wherein the referring includes referring to the storage that stores correspondence information associating extraction attributes, from among extraction attributes included in a plurality of verification rules that used to determine whether a plurality of data match a predetermined condition, which match respective attributes of each data element included in a plurality of data elements, and verification rules which include the extraction attributes, the identifying the verification rule includes identifying, for each of the plurality of data elements and for each attribute, from the plurality of verification rules, the verification rule including the extraction attributes matching each attribute, and the identifying the common verification rule includes identifying, for each of the plurality of data elements, from the plurality of verification rules, a common verification rule which is common in the verification rules corresponding to the attributes of each data element.

13. An extraction apparatus, comprising: a processor configured to:

refer to a storage that stores correspondence information associating extraction attributes which match respective attributes of each data element included in a plurality of data elements, from among extraction attributes included in verification rules, and verification rules which include the extraction attributes, identifies, for each of the plurality of data elements and for each attribute, the verification rule including the extraction attributes matching each attribute;

identify, for each of the plurality of data elements, a common verification rule which is common in the verification rules corresponding to the attributes of each data element; and extract, for each verification rule, data for which the verification rule has been identified as the common verification rule from each data element included in the plurality of data elements.

14. An extraction method, comprising:

referring, by a processor, to a storage that stores correspondence information associating extraction attributes which match respective attributes of each data element included in a plurality of data elements, from among extraction attributes included in verification rules, and verification rules which include the extraction attributes, and identifying, for each of the plurality of data elements and for each attribute, the verification rule including the extraction attributes matching each attribute;

identifying, by a processor, for each of the plurality of data elements, a common verification rule which is common in the verification rules corresponding to the attributes of each data element; and extracting, by a processor, for each verification rule, data for which the verification rule has been identified as the common verification rule from each data element included in the plurality of data elements.

* * * * *